US012562117B2

(12) United States Patent
Long et al.

(10) Patent No.: US 12,562,117 B2
(45) Date of Patent: Feb. 24, 2026

(54) SEMICONDUCTOR SUBSTRATE AND DRIVING METHOD THEREFOR, AND SEMICONDUCTOR DISPLAY APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Chunping Long, Beijing (CN); Jingbo Xu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/833,005

(22) PCT Filed: Jun. 30, 2023

(86) PCT No.: PCT/CN2023/104321

§ 371 (c)(1),
(2) Date: Jul. 25, 2024

(87) PCT Pub. No.: WO2024/012233

PCT Pub. Date: Jan. 18, 2024

(65) Prior Publication Data

US 2025/0124868 A1 Apr. 17, 2025

(30) Foreign Application Priority Data

Jul. 13, 2022 (CN) ......................... 202210817753.6

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01);
(Continued)

(58) Field of Classification Search
CPC ......... G09G 3/3233; G09G 2300/0842; G09G 2310/061; G09G 2310/08;
(Continued)

(56) References Cited

U.S. PATENT DOCUMENTS 8,149,189 B2 * 4/2012 Kim ...................... H05B 45/60
345/76
10,861,385 B2 * 12/2020 Kim .................. H10K 59/1213
(Continued)

FOREIGN PATENT DOCUMENTS

CN 108877651 A 11/2018
CN 110235193 A 9/2019
(Continued)

OTHER PUBLICATIONS

Extended European Search Report from European Application No. 23838725.2 mailed Jun. 3, 2025.

*Primary Examiner* — Jeff Piziali
(74) *Attorney, Agent, or Firm* — Dilworth & Barrese, LLP.; Michael J. Musella, Esq.

(57) ABSTRACT

A semiconductor substrate, a driving method therefor, and a semiconductor display apparatus are provided. Each pixel unit includes a pixel circuit and a light emitting element. The pixel circuit includes a driving circuit, a data writing circuit, a storage circuit, a sensing circuit, and a protecting circuit. The driving circuit controls a drive current that drives the light emitting element. The data writing circuit writes a data signal into the driving circuit. The storage circuit stores the data signal. The sensing circuit is configured to connect the driving circuit with a sensing signal line. The protecting circuit is configured to prevent static electricity generated by the sensing circuit from flowing to the light emitting element and supply the drive current jointly with the driving circuit.
(Continued)

The light emitting element is configured to emit light according to the drive current.

20 Claims, 28 Drawing Sheets

(52) U.S. Cl.
CPC . *G09G 2310/08* (2013.01); *G09G 2320/0233* (2013.01); *G09G 2330/06* (2013.01)

(58) Field of Classification Search
CPC ....... G09G 2320/0233; G09G 2330/06; G09G 2300/0426; G09G 3/32; G09G 3/3208; G09G 2300/0819; G09G 2300/0861; G09G 2320/0295; G09G 2330/04; H10D 86/441; H10D 86/60; H10D 86/40
See application file for complete search history.

(56) References Cited

U.S. PATENT DOCUMENTS

| | | | | |
|---|---|---|---|---|
| 11,568,813 | B1 * | 1/2023 | Ahn | G09G 3/3233 |
| 11,568,816 | B1 * | 1/2023 | Ahn | G02B 27/0172 |
| 12,057,071 | B2 * | 8/2024 | Kim | G09G 3/3291 |
| 12,243,479 | B2 * | 3/2025 | Jung | H10D 30/6757 |
| 12,334,001 | B2 * | 6/2025 | Park | G09G 3/3266 |
| 2002/0084463 | A1 | 7/2002 | Sanford et al. | |
| 2003/0205973 | A1 * | 11/2003 | Park | H10K 59/1213 315/169.1 |
| 2004/0246209 | A1 * | 12/2004 | Sung | H10D 86/40 345/76 |
| 2006/0061525 | A1 * | 3/2006 | Kim | H10K 59/131 345/76 |
| 2006/0145968 | A1 * | 7/2006 | You | G09G 3/3233 345/76 |
| 2007/0080905 | A1 * | 4/2007 | Takahara | G09G 3/3258 345/76 |
| 2007/0139314 | A1 * | 6/2007 | Park | G09G 3/3233 345/76 |
| 2007/0200802 | A1 * | 8/2007 | Kasai | G09G 3/3241 345/76 |
| 2011/0279422 | A1 * | 11/2011 | Byun | G09G 3/3208 345/204 |
| 2013/0032806 | A1 * | 2/2013 | Kimura | G09G 3/3266 257/71 |
| 2014/0118420 | A1 * | 5/2014 | Ma | G09G 3/3233 345/77 |
| 2014/0300281 | A1 * | 10/2014 | Chaji | G09G 3/3233 315/161 |
| 2015/0061537 | A1 * | 3/2015 | Kanda | G09G 3/3233 315/291 |
| 2015/0108437 | A1 * | 4/2015 | Cho | G09G 3/3233 257/40 |
| 2015/0145754 | A1 | 5/2015 | Yang | |
| 2015/0187804 | A1 * | 7/2015 | Park | H10D 86/60 257/43 |
| 2015/0188520 | A1 | 7/2015 | Aoki et al. | |
| 2015/0262528 | A1 * | 9/2015 | Takahara | G09G 3/3258 345/212 |
| 2016/0232846 | A1 * | 8/2016 | Xu | G09G 3/3233 |
| 2018/0197462 | A1 * | 7/2018 | Nagayama | G09G 3/325 |
| 2018/0226029 | A1 * | 8/2018 | Park | G09G 3/3266 |
| 2018/0337288 | A1 * | 11/2018 | Shin | G09G 3/2007 |
| 2019/0325813 | A1 * | 10/2019 | Lo | H10D 86/021 |
| 2020/0051500 | A1 * | 2/2020 | Lin | G09G 3/3225 |
| 2020/0302860 | A1 * | 9/2020 | Kim | G09G 3/325 |
| 2020/0410926 | A1 * | 12/2020 | Li | G09G 3/325 |
| 2021/0056902 | A1 * | 2/2021 | Tanaka | G09G 3/3291 |
| 2021/0065630 | A1 | 3/2021 | Feng et al. | |
| 2021/0359058 | A1 * | 11/2021 | Cho | H10D 86/441 |
| 2022/0093035 | A1 * | 3/2022 | Watsuda | G09G 3/3208 |
| 2022/0101781 | A1 * | 3/2022 | Baumheinrich | G09G 3/32 |
| 2022/0199931 | A1 | 6/2022 | Hamer et al. | |
| 2022/0208871 | A1 * | 6/2022 | Hamer | H10K 59/12 |
| 2023/0140902 | A1 * | 5/2023 | Park | G09G 3/32 |
| 2023/0309342 | A1 * | 9/2023 | Cheng | H10K 59/1216 |

FOREIGN PATENT DOCUMENTS

| | | | | | |
|---|---|---|---|---|---|
| CN | 110634432 | A | | 12/2019 | |
| CN | 111261101 | A | | 6/2020 | |
| CN | 113327556 | A | * | 8/2021 | G09G 3/3233 |
| CN | 114627803 | A | * | 6/2022 | G09G 3/32 |
| CN | 114974120 | A | | 8/2022 | |
| JP | 4052865 | B2 | | 2/2008 | |
| KR | 1020201040588 | A | | 4/2021 | |
| KR | 1020210040588 | A | | 4/2021 | |
| WO | 2021169570 | A1 | | 9/2021 | |

* cited by examiner

SEMICONDUCTOR SUBSTRATE AND DRIVING METHOD THEREFOR, AND SEMICONDUCTOR DISPLAY APPARATUS

The present application claims priority of Chinese Patent Application No. 202210817753.6, filed on Jul. 13, 2022, the disclosure of which is incorporated herein by reference in its entirety as part of the present application.

TECHNICAL FIELD

Embodiments of the present disclosure relate to a semiconductor substrate, a method for driving a semiconductor substrate, and a semiconductor display apparatus.

BACKGROUND

In the field of semiconductor technology, the semiconductor material is usually fabricated on a substrate to form a semiconductor substrate, and the semiconductor substrate may be a display panel or a light-emitting panel, etc. On the semiconductor substrate, a semiconductor transistor is provided. The semiconductor transistor is made of a semiconductor material and may have two states of turn-on and turn-off, and in the turn-on state, the semiconductor transistor may further have different turn-on degrees. The semiconductor substrate is usually applied to a display apparatus as a display panel.

Organic light-emitting diode (OLED) display apparatuses have gradually received widespread attention due to the advantages such as wide viewing angle, high contrast ratio, fast response speed, higher light emission brightness and lower driving voltage than inorganic light-emitting display apparatuses. Due to the above-described characteristics, the organic light-emitting diodes (OLEDs) may be applied to mobile phones, monitors, tablet personal computers, digital cameras, instruments, and other apparatuses having a display function.

The pixel circuit in the OLED display apparatus usually adopts a matrix drive mode, which is divided into active matrix (AM) drive and passive matrix (PM) drive according to whether switch components are introduced in each pixel unit. For example, the switch components may be semiconductor transistors (e.g., thin film transistors, etc.).

Although the PMOLED has simple process and low costs, it cannot meet the needs of high-resolution large-sized display due to drawbacks such as cross talk, high power consumption, and low lifespan. In contrast, the AMOLED integrates a group of thin film transistors and a storage capacitor in the pixel circuit of each pixel, and controls the current flowing through the OLED by performing drive control on the thin film transistors and the storage capacitor, thereby allowing the OLED to emit light as needed. As compared with the PMOLED, the AMOLED has lower drive current required, lower power consumption, and longer lifespan, which can meet the needs of high-resolution multi-grayscale large-sized display. Meanwhile, the AMOLED has significant advantages in visual angle, color restoration, power consumption, response time, etc., thereby being suitable for a display apparatus with high information content and high resolution.

SUMMARY

At least one embodiment of the present disclosure provides a semiconductor substrate, which comprises an array substrate. The array substrate comprises a plurality of pixel units arranged in an array, and each pixel unit comprises a pixel circuit and a light emitting element. The pixel circuit comprises a driving circuit, a data writing circuit, a storage circuit, a sensing circuit, and a protecting circuit. The driving circuit comprises a control terminal, a first terminal, and a second terminal, and is configured to control a drive current that drives the light emitting element to emit light, and the first terminal of the driving circuit receives a first voltage of a first voltage terminal. The data writing circuit is connected with the control terminal of the driving circuit, and is configured to write a data signal into the control terminal of the driving circuit in response to a first scanning signal. A first terminal of the storage circuit is connected with the control terminal of the driving circuit, a second terminal of the storage circuit is connected with the second terminal of the driving circuit, and the storage circuit is configured to store the data signal written by the data writing circuit. The sensing circuit is connected with the second terminal of the driving circuit, and is configured to connect the second terminal of the driving circuit with a sensing signal line in response to a second scanning signal. The protecting circuit comprises a control terminal, a first terminal, and a second terminal, the first terminal of the protecting circuit is connected with the first terminal of the driving circuit, the control terminal of the protecting circuit and the second terminal of the protecting circuit are both connected with the second terminal of the driving circuit, and the protecting circuit is configured to prevent static electricity generated by the sensing circuit from flowing to the light emitting element and supply the drive current jointly with the driving circuit. A first terminal of the light emitting element is connected with the second terminal of the driving circuit, a second terminal of the light emitting element receives a second voltage of a second voltage terminal, and the light emitting element is configured to emit light according to the drive current.

For example, in the semiconductor substrate provided by an embodiment of the present disclosure, the driving circuit comprises a first transistor. A gate electrode of the first transistor serves as the control terminal of the driving circuit, a first electrode of the first transistor serves as the first terminal of the driving circuit, and a second electrode of the first transistor serves as the second terminal of the driving circuit.

For example, in the semiconductor substrate provided by an embodiment of the present disclosure, the protecting circuit comprises a second transistor. A gate electrode of the second transistor serves as the control terminal of the protecting circuit, a first electrode of the second transistor serves as the first terminal of the protecting circuit, and a second electrode of the second transistor serves as the second terminal of the protecting circuit. The first electrode of the second transistor is connected with the first electrode of the first transistor. The gate electrode of the second transistor is connected with the second electrode of the second transistor, and is connected with the second electrode of the first transistor.

For example, in the semiconductor substrate provided by an embodiment of the present disclosure, the second transistor constitutes a diode-connection mode.

For example, in the semiconductor substrate provided by an embodiment of the present disclosure, the first transistor and the second transistor are both N-type thin film transistors or are both P-type thin film transistors.

For example, in the semiconductor substrate provided by an embodiment of the present disclosure, the data writing circuit comprises a third transistor. A gate electrode of the third transistor is connected with a first scanning line to receive the first scanning signal, a first electrode of the third transistor is connected with a data line to receive the data signal, and a second electrode of the third transistor is connected with the control terminal of the driving circuit.

For example, in the semiconductor substrate provided by an embodiment of the present disclosure, the sensing circuit comprises a fourth transistor. A gate electrode of the fourth transistor is connected with a second scanning line to receive the second scanning signal, a first electrode of the fourth transistor is connected with the second terminal of the driving circuit, and a second electrode of the fourth transistor is connected with the sensing signal line.

For example, in the semiconductor substrate provided by an embodiment of the present disclosure, the storage circuit comprises a storage capacitor. A first electrode of the storage capacitor serves as the first terminal of the storage circuit, and a second electrode of the storage capacitor serves as the second terminal of the storage circuit.

For example, in the semiconductor substrate provided by an embodiment of the present disclosure, the light emitting element comprises an organic light-emitting diode, an anode of the organic light-emitting diode serves as the first terminal of the light emitting element, and a cathode of the organic light-emitting diode serves as the second terminal of the light emitting element.

For example, the semiconductor substrate provided by an embodiment of the present disclosure further comprises a reset circuit. The reset circuit is connected with the control terminal of the driving circuit, and is configured to apply a reset voltage to the control terminal of the driving circuit in response to a reset signal.

For example, in the semiconductor substrate provided by an embodiment of the present disclosure, the reset circuit comprises a fifth transistor. A gate electrode of the fifth transistor is connected with a reset signal line to receive the reset signal, a first electrode of the fifth transistor is connected with the control terminal of the driving circuit, and a second electrode of the fifth transistor is connected with a reset voltage terminal to receive the reset voltage.

For example, in the semiconductor substrate provided by an embodiment of the present disclosure, the reset voltage terminal and the second voltage terminal are a same voltage terminal, and the reset voltage and the second voltage are a same voltage signal.

For example, in the semiconductor substrate provided by an embodiment of the present disclosure, a channel width-to-length ratio of the first transistor ranges from 12.6:6 to 16.2:6.

For example, in the semiconductor substrate provided by an embodiment of the present disclosure, the array substrate comprises a base substrate, a buffer layer, and a gate insulation layer. The first transistor comprises an active layer. The buffer layer is arranged on the base substrate, the active layer is arranged on the buffer layer, the gate insulation layer is arranged on the buffer layer and covers the active layer, and the gate electrode of the first transistor is arranged on the gate insulation layer.

For example, in the semiconductor substrate provided by an embodiment of the present disclosure, the array substrate further comprises an interlayer insulation layer. The interlayer insulation layer is arranged on the gate insulation layer and covers the gate electrode of the first transistor, and the first electrode of the first transistor and the second electrode of the first transistor are arranged on the interlayer insulation layer.

For example, in the semiconductor substrate provided by an embodiment of the present disclosure, the first electrode of the first transistor and the second electrode of the first transistor are arranged on the gate insulation layer, and the first electrode of the first transistor, the second electrode of the first transistor, and the gate electrode of the first transistor are located in a same layer.

For example, in the semiconductor substrate provided by an embodiment of the present disclosure, the first electrode of the first transistor is connected with the active layer through a first via hole at least penetrating through the gate insulation layer, and the second electrode of the first transistor is connected with the active layer through a second via hole at least penetrating through the gate insulation layer.

For example, in the semiconductor substrate provided by an embodiment of the present disclosure, the active layer comprises at least one grooved region, and the grooved region is a hole that penetrates through the active layer in a direction perpendicular to the base substrate.

For example, in the semiconductor substrate provided by an embodiment of the present disclosure, the at least one grooved region comprises a first grooved region and a second grooved region, the first grooved region is adjacent to the first via hole, and the second grooved region is adjacent to the second via hole.

For example, in the semiconductor substrate provided by an embodiment of the present disclosure, the first via hole exposes a portion of the active layer, and exposes a portion of the buffer layer through the first grooved region; and/or, the second via hole exposes a portion of the active layer, and exposes a portion of the buffer layer through the second grooved region.

For example, in the semiconductor substrate provided by an embodiment of the present disclosure, shapes of the first grooved region and the second grooved region are both rectangles.

For example, in the semiconductor substrate provided by an embodiment of the present disclosure, a size of the first grooved region is same as a size of the second grooved region.

For example, in the semiconductor substrate provided by an embodiment of the present disclosure, the at least one grooved region comprises one grooved region. One of the first electrode of the first transistor and the second electrode of the first transistor is a source electrode of the first transistor, and one of the first via hole and the second via hole that is adjacent to the source electrode of the first transistor is a target via hole, and the grooved region is adjacent to the target via hole.

For example, in the semiconductor substrate provided by an embodiment of the present disclosure, the target via hole exposes a portion of the active layer, and exposes a portion of the buffer layer through the grooved region.

For example, in the semiconductor substrate provided by an embodiment of the present disclosure, a shape of the grooved region is a rectangle.

For example, in the semiconductor substrate provided by an embodiment of the present disclosure, a reference width of the active layer is Wd, a width of the grooved region is Wvia, an effective width of the active layer in a position of the grooved region is W1, and an effective width of the active layer in a non-grooved position is W2, $W2=Wd$, $W1=Wd-Wvia$; and a reference length of the active layer is Ld, a length of the grooved region is L1, and an effective length of the active layer in the non-grooved position is L2, $Ld=L1+L2$.

For example, in the semiconductor substrate provided by an embodiment of the present disclosure, a preset channel current of the first transistor is represented as I1, and a grooving channel current of the first transistor is represented as I2, $$\frac{I2}{I1} = \frac{Wd}{Ld}\left(\frac{L1}{W1} + \frac{L2}{W2}\right).$$

For example, in the semiconductor substrate provided by an embodiment of the present disclosure, a numerical range of I2/I1 is from 1 to 1.5.

For example, in the semiconductor substrate provided by an embodiment of the present disclosure, the array substrate further comprises a light shielding layer. The light shielding layer is arranged on the base substrate, the buffer layer is arranged on the base substrate and covers the light shielding layer, the light shielding layer is made of metal, and at least a portion of the light shielding layer serves as the gate electrode of the second transistor.

For example, in the semiconductor substrate provided by an embodiment of the present disclosure, the first electrode of the first transistor serves as the first electrode of the second transistor, the second electrode of the first transistor serves as the second electrode of the second transistor; and the second electrode of the second transistor is connected with the light shielding layer through a third via hole that at least penetrates through the buffer layer and the gate insulation layer.

For example, in the semiconductor substrate provided by an embodiment of the present disclosure, a channel width of the second transistor is W3, a channel length of the second transistor is L3, a thickness of the buffer layer is dbuf, and a thickness of the gate insulation layer is dgi; a channel current of the second transistor is Ie, an initial channel current of the first transistor is Id, and the initial channel current Id of the first transistor is equal to the grooving channel current I2 of the first transistor;

$$\frac{Id}{Ie} = \frac{W3}{L3}\left(\frac{L1}{W1} + \frac{L2}{W2}\right)\frac{dgi}{dbuf}.$$

For example, in the semiconductor substrate provided by an embodiment of the present disclosure, a numerical range of Id/Ie is from 0.5 to 1.

For example, in the semiconductor substrate provided by an embodiment of the present disclosure, the third via hole has a first sidewall and a second sidewall opposite to each other, the first sidewall is close to the active layer, and the second sidewall is away from the active layer, a slope of the first sidewall is different from a slope of the second sidewall.

For example, in the semiconductor substrate provided by an embodiment of the present disclosure, the slope of the first sidewall is greater than the slope of the second sidewall.

For example, in the semiconductor substrate provided by an embodiment of the present disclosure, the array substrate further comprises a gate metal layer and a passivation layer; the gate metal layer is arranged on the gate insulation layer, the gate electrode of the first transistor, the first electrode of the first transistor, and the second electrode of the first transistor are all located on the gate metal layer, and the passivation layer is arranged on the gate metal layer; and the first terminal of the light emitting element is an anode, the anode is connected with a transfer portion located in the gate metal layer through a fourth via hole penetrating through the passivation layer, and the transfer portion is connected with the light shielding layer and the second electrode of the first transistor through the third via hole.

For example, in the semiconductor substrate provided by an embodiment of the present disclosure, a distance between edges of the fourth via hole and the third via hole that are close to each other is das, and an aperture of the third via hole in a plane where the gate metal layer is located is ds, $$\frac{|das - ds|}{ds} \leq 0.3.$$

For example, in the semiconductor substrate provided by an embodiment of the present disclosure, das=ds.

For example, in the semiconductor substrate provided by an embodiment of the present disclosure, a distance between an edge of the second electrode of the first transistor that is away from the third via hole and an edge of the second electrode of the first transistor that is close to the third via hole is dgs, the aperture of the third via hole in the plane where the gate metal layer is located is ds;

$$\frac{|dgs - ds|}{ds} \leq 0.3.$$

For example, in the semiconductor substrate provided by an embodiment of the present disclosure, dgs=ds.

For example, in the semiconductor substrate provided by an embodiment of the present disclosure, the array substrate further comprises a data line, the data line is used for transmitting the data signal, the data line is arranged on the interlayer insulation layer, and the data line is located in a same layer as the first electrode of the first transistor and the second electrode of the first transistor.

For example, in the semiconductor substrate provided by an embodiment of the present disclosure, the array substrate further comprises a data line, the data line is used for transmitting the data signal, the data line is arranged on the gate insulation layer, and the data line is located in a same layer as the gate electrode of the first transistor, the first electrode of the first transistor, and the second electrode of the first transistor.

For example, in the semiconductor substrate provided by an embodiment of the present disclosure, the third transistor, the fourth transistor, the first scanning line, and the second scanning line are located on a same side of the first transistor.

For example, in the semiconductor substrate provided by an embodiment of the present disclosure, the portion of the active layer that is exposed by the first via hole and/or the second via hole is a conducting region formed through plasma doping.

For example, in the semiconductor substrate provided by an embodiment of the present disclosure, one of the first electrode of the first transistor and the second electrode of the first transistor is a drain electrode of the first transistor, and one of the first via hole and the second via hole that is adjacent to the drain electrode of the first transistor is a same via hole as the third via hole, the drain electrode of the first transistor is connected with both the portion of the active layer that is exposed and the portion of the light shielding layer that is exposed through the third via hole.

For example, in the semiconductor substrate provided by an embodiment of the present disclosure, the array substrate further comprises a passivation layer and a planarization layer. One of the first electrode of the first transistor and the second electrode of the first transistor is a drain electrode of the first transistor; the passivation layer and the planarization layer are sequentially stacked, and located above the drain electrode of the first transistor; and a fifth via hole is provided in the passivation layer and the planarization layer, and the fifth via hole exposes the drain electrode of the first transistor.

For example, in the semiconductor substrate provided by an embodiment of the present disclosure, the fifth via hole comprises a step located at an interface between the passivation layer and the planarization layer, and a width of the step is less than or equal to 1 μm.

For example, in the semiconductor substrate provided by an embodiment of the present disclosure, the array substrate further comprises a light shielding layer, the light shielding layer is arranged on the base substrate, the buffer layer is arranged on the base substrate and covers the light shielding layer, the light shielding layer is made of metal, and the light shielding layer serves as the gate electrode of the second transistor. An orthogonal projection of the fifth via hole in the direction perpendicular to the base substrate at least partially overlaps with an orthogonal projection of a portion of the light shielding layer that serves as the gate electrode of the second transistor in the direction perpendicular to the base substrate.

For example, in the semiconductor substrate provided by an embodiment of the present disclosure, the sensing circuit comprises a fourth transistor, a gate electrode of the fourth transistor is connected with a second scanning line to receive the second scanning signal, a first electrode of the fourth transistor is connected with the second terminal of the driving circuit, and a second electrode of the fourth transistor is connected with the sensing signal line; the light shielding layer further serves as the gate electrode of the fourth transistor, and serves as the first voltage terminal; and the light shielding layer is a double-layer metal structure.

At least one embodiment of the present disclosure further provides a semiconductor display apparatus, which comprises the semiconductor substrate provided by any one of the embodiments of the present disclosure.

At least one embodiment of the present disclosure further provides a method for driving the semiconductor substrate provided by any one of the embodiments of the present disclosure. The method comprises: in a display phase, causing the driving circuit and the protecting circuit to jointly supply the drive current, so as to drive the light emitting element to emit light; and in a sensing phase, turning on the sensing circuit to connect the second terminal of the driving circuit with the sensing signal line, and adopting the protecting circuit to prevent static electricity generated by the sensing circuit from flowing to the light emitting element.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
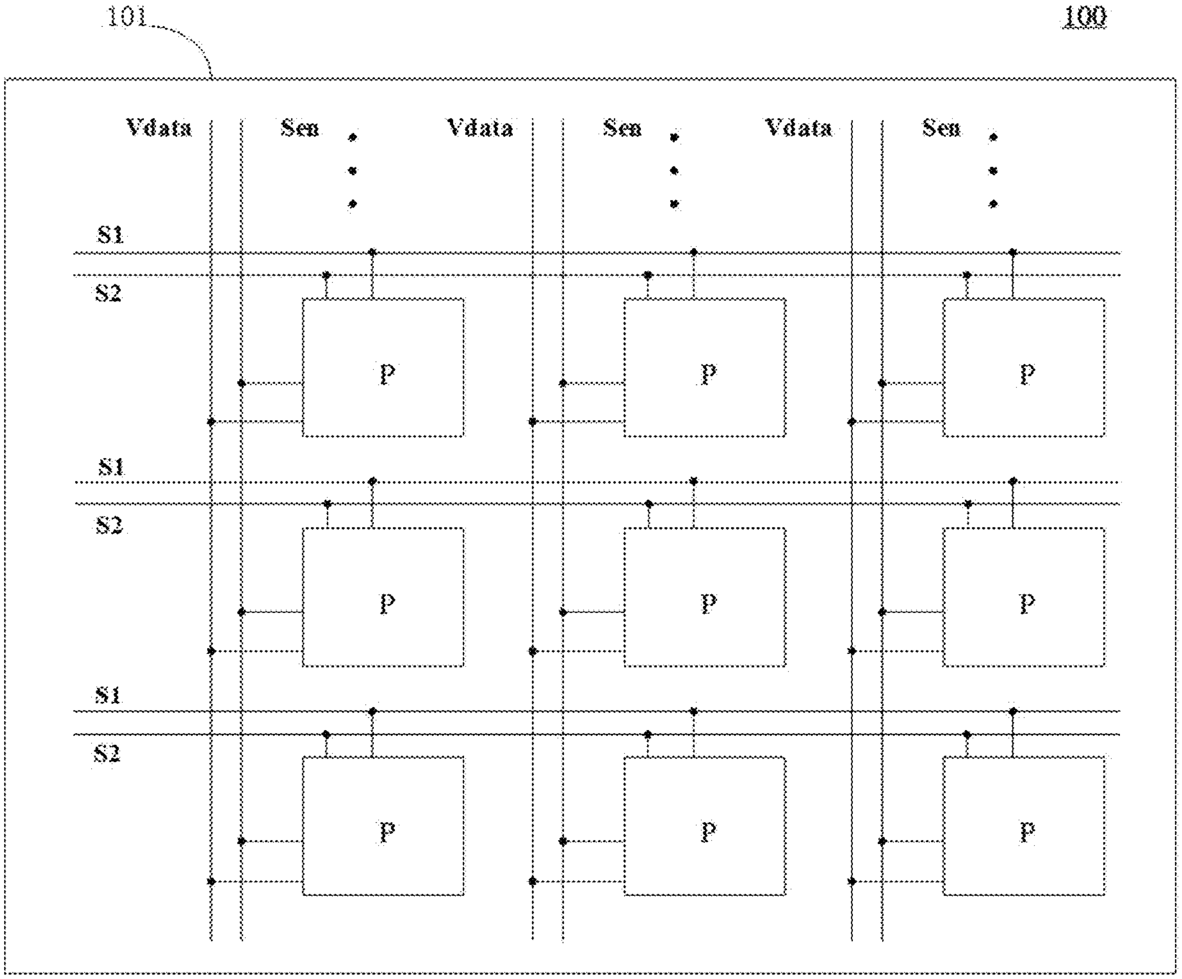
FIG. 1 is a schematic diagram of a display panel provided by some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly.

The transistor in a pixel circuit is a semiconductor transistor made of a semiconductor material (e.g., doped polycrystalline silicon). In the case of using a semiconductor substrate as a display panel, due to limitations of semiconductor technology, process stability of the transistor in the pixel circuit becomes a main factor affecting the displayed picture. Differences in threshold voltage and mobility of drive transistors between a plurality of pixels result in different currents supplied to respective pixels, causing deviations between actual brightness of the respective pixels and expected ideal brightness, so that brightness uniformity of the display screen may decrease, and even regional spots or patterns may be generated. Moreover, factors such as voltage drop of a voltage source (IR Drop) and OLED aging may also affect brightness uniformity of the display screen. Therefore, compensation techniques are needed to make pixels achieve ideal brightness.

For example, external compensation may be adopted, that is, to draw out the current of the driving transistor and use a circuit outside the pixel circuit to detect the current, thereby calculating a deviation and a value that needs to be compensated, thus implementing compensation for the driving transistor. For example, a sensing transistor may be adopted to draw out the current of the driving transistor. However, when the sensing transistor is turned on, it is easy to generate static electricity, which may damage the OLED device and affect the service life of the OLED device.

At least one embodiment of the present disclosure provides a semiconductor substrate and a driving method therefor, and a semiconductor display apparatus. The semiconductor substrate can reduce probability of damage to the organic light-emitting diode (OLED) device, play a role in protecting the OLED device, and prolong the service life of the OLED device.

It should be noted that in illustration of the present disclosure, the display panel is a specific example of a semiconductor substrate, the display panel is essentially a semiconductor substrate, and the display panel described herein may refer to semiconductor substrate. Therefore, although the display panel and related features thereof are described herein, the description should be regarded as that of the semiconductor substrate and related features thereof. Correspondingly, the display apparatus including the display panel is also a semiconductor display apparatus. The display apparatus described herein may refer to a semiconductor display apparatus. Therefore, although the display apparatus and related features thereof are described herein, the description should be regarded as that of the semiconductor display apparatus and related features thereof.

Hereinafter, the embodiments of the present disclosure are illustrated in detail with reference to the accompanying drawings. It should be noted that same reference signs in different drawings are used to refer to same components that have already been described.

At least one embodiment of the present disclosure provides a semiconductor substrate. The semiconductor substrate includes an array substrate. The array substrate includes a plurality of pixel units arranged in an array, each pixel unit includes a pixel circuit and a light emitting element. The pixel circuit includes a driving circuit, a data writing circuit, a storage circuit, a sensing circuit and a protecting circuit. The driving circuit includes a control terminal, a first terminal and a second terminal, and is configured to control a drive current that drives the light emitting element to emit light. The first terminal of the driving circuit receives a first voltage of a first voltage terminal. The data writing circuit is connected with the control terminal of the driving circuit, and is configured to write a data signal into the control terminal of the driving circuit in response to a first scanning signal. A first terminal of the storage circuit is connected with the control terminal of the driving circuit, a second terminal of the storage circuit is connected with the second terminal of the driving circuit, and the storage circuit is configured to store the data signal written by the data writing circuit. The sensing circuit is connected with the second terminal of the driving circuit, and is configured to connect the second terminal of the driving circuit with a sensing signal line in response to a second scanning signal. The protecting circuit includes a control terminal, a first terminal and a second terminal. The first terminal of the protecting circuit is connected with the first terminal of the driving circuit, the control terminal of the protecting circuit and the second terminal of the protecting circuit are both connected with the second terminal of the driving circuit, and the protecting circuit is configured to prevent static electricity generated by the sensing circuit from flowing to the light emitting element and supply the drive current jointly with the driving circuit. A first terminal of the light emitting element is connected with the second terminal of the driving circuit, a second terminal of the light emitting element receives a second voltage of a second voltage terminal, and the light emitting element is configured to emit light according to the drive current.

FIG. 1 is a schematic diagram of a display panel provided by some embodiments of the present disclosure. As illustrated in FIG. 1, in some embodiments, a display panel 100 includes an array substrate 101, and the array substrate 101 includes a plurality of pixel units P arranged in an array. The display panel 100 may be an OLED display panel, a quantum dot light-emitting diode (QLED) display panel, or other suitable display panel. Each pixel unit includes a pixel circuit 20 and a light emitting element L (not illustrated in FIG. 1). Each pixel unit is connected with a first scanning line S1, a second scanning line S2, a data line Vdata and a sensing signal line Sen corresponding thereto.

Figure 2:
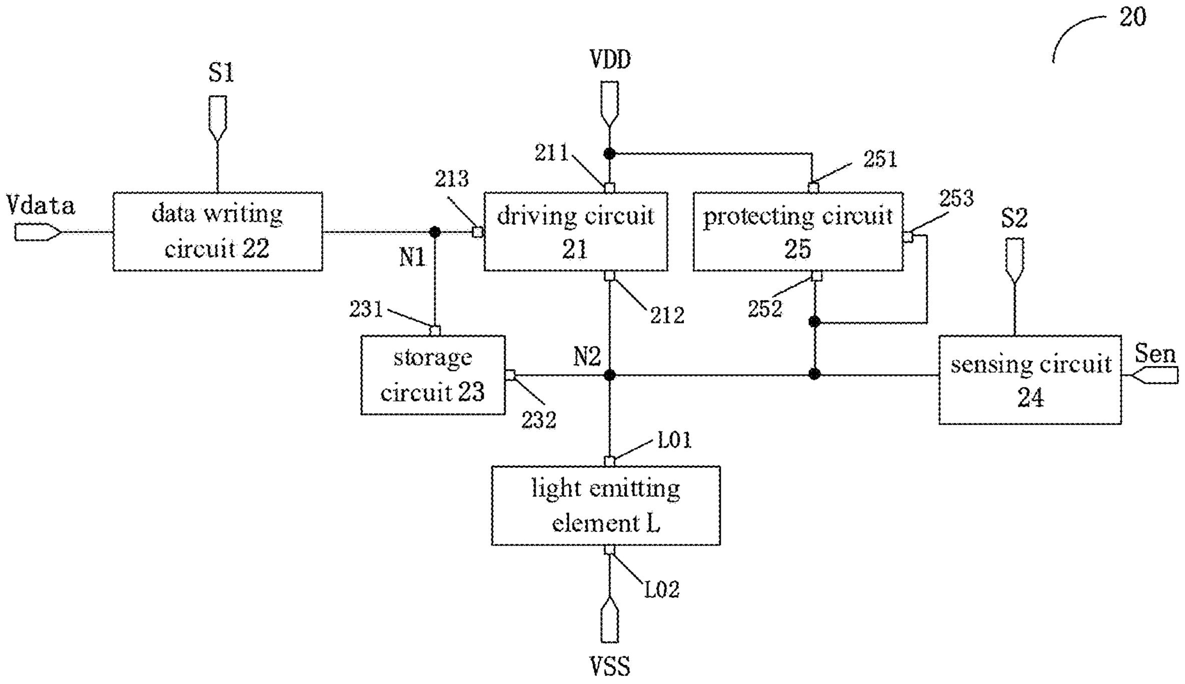
FIG. 2 is a schematic block diagram of a pixel circuit in a display panel provided by some embodiments of the present disclosure.

FIG. 2 is a schematic block diagram of a pixel circuit in a display panel provided by some embodiments of the present disclosure. As illustrated in FIG. 2, in some embodiments, each pixel unit includes a pixel circuit 20 and a light emitting element L. The pixel circuit 20 includes a driving circuit 21, a data writing circuit 22, a storage circuit 23, a sensing circuit 24, and a protecting circuit 25.

The driving circuit 21 includes a first terminal 211, a second terminal 212 and a control terminal 213, and is configured to control a drive current that drives the light emitting element L to emit light. The first terminal 211 of the driving circuit 21 receives a first voltage of a first voltage terminal VDD. The control terminal 213 of the driving circuit 21 is connected with a first node N1. The first terminal 211 of the driving circuit 21 is connected to the first voltage terminal VDD (e.g., a high level) to receive the first voltage. The second terminal 212 of the driving circuit 21 is connected with a second node N2. For example, the driving circuit 21 can supply a drive current to the light emitting element L during operation to drive the light emitting element L to emit light, and cause the light emitting element L to emit light according to a required "gray scale". For example, the light emitting element L may be an OLED and be configured to have both ends respectively connected with the second node N2 and a second voltage terminal VSS (e.g., the ground). The embodiments of the present disclosure include but are not limited to such a case.

The data writing circuit 22 is connected with the control terminal 213 of the driving circuit 21 (the first node N1), and is configured to write a data signal into the control terminal 213 of the driving circuit 21 in response to a first scanning signal. For example, the data writing circuit 22 is respectively connected with the data line Vdata, the first node N1, and a first scanning line S1. For example, the first scanning signal from the first scanning line S1 is applied to the data writing circuit 22 to control turn-on state or turn-off state of the data writing circuit 22. For example, during a data writing phase, the data writing circuit 22 can be turned on in response to the first scanning signal, so that the data signal supplied by the data line Vdata can be written into the control terminal 213 of the driving circuit 21 (the first node N1), and then the data signal may be stored in the storage circuit 23. The stored data signal is used for generating the drive current that drives the light emitting element L to emit light.

A first terminal 231 of the storage circuit 23 is connected with the control terminal 213 of the driving circuit 21 (the first node N1), and a second terminal 232 of the storage circuit 23 is connected with the second terminal 212 of the driving circuit 21 (the second node N2). The storage circuit 23 is configured to store the data signal written by the data writing circuit 22. For example, the storage circuit 23 can store the data signal and cause the stored data signal to control the driving circuit 21.

The sensing circuit 24 is connected with the second terminal 212 of the driving circuit 21 (the second node N2), and is configured to connect the second terminal 212 of the driving circuit 21 with a sensing signal line Sen in response to a second scanning signal. For example, the sensing circuit 24 is respectively connected with the second node N2, the second scanning line S2, and the sensing signal line Sen. For example, the second scanning signal from the second scanning line S2 is applied to the sensing circuit 24 to control turn-on state or turn-off state of the sensing circuit 24.

For example, the sensing signal line Sen can supply a second voltage (e.g., the ground voltage) and can switch to a floating state. For example, during a sensing phase, when writing detection data, the sensing signal line Sen supplies a second voltage to ensure that the detection data is written correctly. Then the sensing signal line Sen switches to a floating state, and the second terminal 212 of the driving circuit 21 is electrically connected with the sensing signal line Sen, so that the current flowing through the driving circuit 21 can be detected.

For example, the current may be converted into a voltage signal through a separately arranged detecting circuit (e.g., an operational amplifier, an analog-to-digital converter, etc.); then the voltage signal is converted into a digital signal and the obtained signal is stored; the signal can be further processed by algorithms to obtain compensation data; thereafter during a normal light emitting phase of the pixel circuit, the compensation data obtained by algorithm processing is superimposed on the input display data to obtain compensated display data; and the compensated display data can be written by the data writing circuit 22 to control the driving circuit 21, thereby compensating for differences in display brightness uniformity caused by differences in threshold voltage and mobility, etc., of the transistors in the driving circuit 21.

For example, a first terminal L01 of the light emitting element L is connected with the second terminal 212 of the driving circuit 21 (the second node N2) to receive the drive current. A second terminal L02 of the light emitting element L receives the second voltage of the second voltage terminal VSS. The light emitting element L is configured to emit light according to the drive current.

The protecting circuit 25 includes a first terminal 251, a second terminal 252 and a control terminal 253. The first terminal 251 of the protecting circuit 25 is connected with the first terminal 211 of the driving circuit 21. The control terminal 253 of the protecting circuit 25 and the second terminal 252 of the protecting circuit 25 are both connected with the second terminal 212 of the driving circuit 21 (the second node N2). The protecting circuit 25 is configured to prevent static electricity generated by the sensing circuit 24 from flowing to the light emitting element L, and to supply the drive current jointly with the driving circuit 21.

In the embodiments of the present disclosure, because static electricity is easily generated when the sensing circuit 24 is turned on and the static electricity may damage the light emitting element L, the protecting circuit 25 is arranged to play a role in protection and prevent the static electricity generated by the sensing circuit 24 from flowing to the light emitting element L, thus avoiding the static electricity from damaging the light emitting element L, thereby reducing probability of damage to the light emitting element L. In addition, during emission of the light emitting element L, the protecting circuit 25 plays a role in positive feedback and can supply the drive current jointly with the driving circuit 21.

Figure 3:
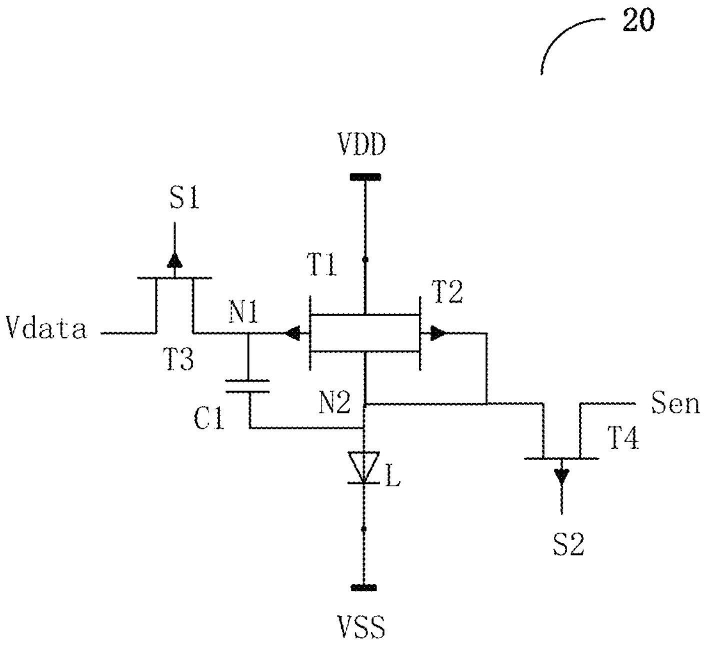
FIG. 3 is a circuit diagram of a specific implementation example of the pixel circuit illustrated in FIG. 2.

FIG. 3 is a circuit diagram of a specific implementation example of the pixel circuit illustrated in FIG. 2. As illustrated in FIG. 3, the pixel circuit 20 comprises first to fourth transistors T1, T2, T3, T4, as well as a storage capacitor C1; and the pixel circuit 20 is connected with the light emitting element L. For example, the first transistor T1 is used as a driving transistor; while the other transistors are used as switch transistors. For example, the light emitting element L may be an OLED of various types, for example, a top emission structure, a bottom emission structure, a double-sided emission structure, etc., and may emit red light, green light, blue light, or white light, etc., which is not limited in the embodiments of the present disclosure.

For example, as illustrated in FIG. 3, the driving circuit 21 may be implemented as the first transistor T1. A gate electrode of the first transistor T1 serves as the control terminal 213 of the driving circuit 21 and is connected with the first node N1; a first electrode of the first transistor T1 serves as the first terminal 211 of the driving circuit 21 and is connected with the first voltage terminal VDD; and a second electrode of the first transistor T1 serves as the second terminal 212 of the driving circuit 21 and is connected with the second node N2. It should be noted that the embodiments of the present disclosure are not limited thereto, and the driving circuit 21 may also be a circuit composed of other components. For example, the driving circuit 21 may have two groups of driving transistors, for example, the two groups of driving transistors can be switched according to specific situations.

The protecting circuit 25 may be implemented as the second transistor T2. A gate electrode of the second transistor T2 serves as the control terminal 253 of the protecting circuit 25; a first electrode of the second transistor T2 serves as the first terminal 251 of the protecting circuit 25; and a second electrode of the second transistor T2 serves as the second terminal 252 of the protecting circuit 25. The first electrode of the second transistor T2 is connected with the first electrode of the first transistor T1; and the gate electrode of the second transistor T2 is connected with the second electrode of the second transistor T2, and is connected to the second electrode of the first transistor T1. For example, the second transistor T2 constitutes a diode-connection mode (i.e., the second transistor T2 is diode connected), and by coupling the second transistor T2 in parallel to the first transistor T1, it can effectively prevent static electricity generated by the sensing circuit 24 from flowing to the light emitting element L, avoid the static electricity from damaging the light emitting element L, and play a role in protecting the light emitting element L, thereby reducing probability of damage to the light emitting element L and prolonging service life thereof. For example, the first transistor T1 and the second transistor T2 are both N-type thin film transistors, or the first transistor T1 and the second transistor T2 are both P-type thin film transistors, that is, the first transistor T1 and the second transistor T2 may be of a same type of transistor.

The data writing circuit 22 may be implemented as the third transistor T3. A gate electrode of the third transistor T3 is connected with the first scanning line S1 to receive the first scanning signal, and a first electrode of the third transistor T3 is connected with the data line Vdata to receive the data signal. A second electrode of the third transistor T3 is connected with the control terminal 213 of the driving circuit 21 (the first node N1), that is, connected with the gate electrode of the first transistor T1. It should be noted that the embodiments of the present disclosure are not limited thereto, and the data writing circuit 22 may also be a circuit composed of other components.

The sensing circuit 24 may be implemented as the fourth transistor T4. A gate electrode of the fourth transistor T4 is connected with the second scanning line S2 to receive the second scanning signal, a first electrode of the fourth transistor T4 is connected with the second terminal 212 of the driving circuit 21 (the second node N2), and a second electrode of the fourth transistor T4 is connected with the sensing signal line Sen. It should be noted that the embodiments of the present disclosure are not limited thereto, and the sensing circuit 24 may also be a circuit composed of other components.

The storage circuit 23 may be implemented as the storage capacitor C1. A first electrode of the storage capacitor C1 serves as the first terminal 231 of the storage circuit 23 and is connected with the first node N1. A second electrode of the storage capacitor C1 serves as the second terminal 232 of the storage circuit 23 and is connected with the second node N2. It should be noted that the embodiments of the present disclosure are not limited thereto, and the storage circuit 23 may also be a circuit composed of other components. For example, the storage circuit 23 may include two capacitors connected in parallel/series with each other.

The light emitting element L may be implemented as an organic light-emitting diode (OLED). An anode of the OLED serves as the first terminal L01 of the light emitting element L, is connected with the second node N2, and is configured to receive the drive current from the second terminal 212 of the driving circuit 21. A cathode of the organic light-emitting diode serves as the second terminal L02 of the light emitting element L, and is connected with the second voltage terminal VSS to receive the second voltage. For example, in a display panel, when the pixel circuits 20 are arranged in an array, cathodes of light emitting elements L in pixel circuits 20 of the respective pixel units can be electrically coupled to a same voltage terminal, that is, the display panel may adopt a mode of common-cathode connection.

For example, when designing a layout of the pixel circuit 20, the third transistor T3, the fourth transistor T4, the first scanning line S1, and the second scanning line S2 can be located on the same side of the first transistor T1, which facilitates wiring and is favorable for increasing an aperture ratio.

It should be noted that for the purpose of description, the first voltage terminal VDD according to the respective embodiments of the present disclosure, for example, keeps inputting a direct-current high-level signal, and the direct-current high level is referred to as the first voltage. The second voltage terminal VSS, for example, keeps inputting a direct-current low-level signal, and the direct-current low level is referred to as the second voltage (which may also be the ground voltage) and is lower than the first voltage. The following respective embodiments are the same in this aspect, and no details will be repeated here.

Figure 4:
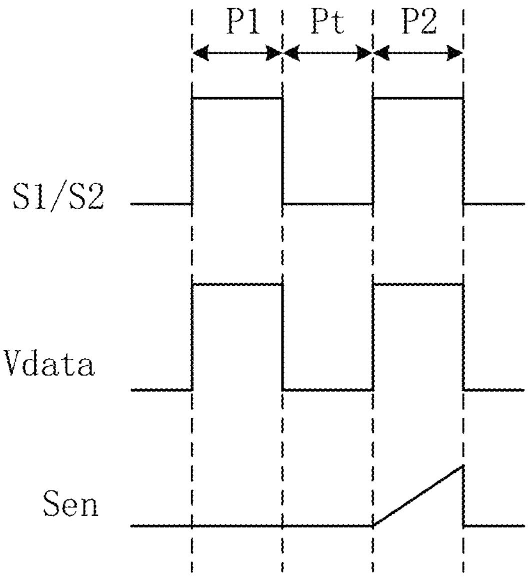
FIG. 4 is a timing diagram of the circuit structure illustrated in FIG. 3.

FIG. 4 is a timing diagram of the circuit structure illustrated in FIG. 3. Hereinafter, an operation principle of performing sensing on the pixel circuit 20 illustrated in FIG. 3 is briefly illustrated in conjunction with the signal timing diagram illustrated in FIG. 4, and illustration here is given by taking the respective transistors as N-type transistors as an example, but the embodiments of the present disclosure are not limited thereto.

During the sensing operation, data is written into the driving circuit 21, and the sensing circuit 24 is adopted to electrically connect the second terminal 212 of the driving circuit 21 with the sensing signal line Sen. As illustrated in FIG. 4, the sensing phase includes two phases, which are respectively a detection data writing phase P1 and an electrical detecting phase P2. FIG. 4 illustrates timing waveforms of respective signals in each phase.

In the detection data writing phase P1, the first scanning signal (supplied by the first scanning line S1) and a detection data signal (supplied by the data line Vdata) are input to turn on the data writing circuit 22 and the driving circuit 21. The data writing circuit 22 writes the detection data signal into the driving circuit 21. The storage circuit 23 stores the detection data signal. The sensing signal line Sen supplies a second voltage. At this time, the third transistor T3 is turned on by a high level of the first scanning signal; the first transistor T1 is turned on by a high level of the first node N1; and the fourth transistor T4 is turned on by a high level of the second scanning signal. Thus, a data writing path is formed, and the detection data signal passes through the third transistor T3 and then charges the storage capacitor C1. At this time, the sensing signal line Sen supplies the second voltage, that is, the level of the second node N2 is the second voltage. After the detection data writing phase P1, voltage information carrying the detection data signal is stored in the storage capacitor C1 for use in a next phase. In other examples, when the second scanning signal is at a low level, the fourth transistor T4 is turned off, and at this time, there is no need to supply the second voltage to the sensing signal line Sen.

In the electrical detecting phase P2, the second scanning signal (supplied by the second scanning line S2) is input to turn on the sensing circuit 24. The sensing circuit 24 electrically connects the second terminal 212 of the driving circuit 21 with the sensing signal line Sen, and the sensing signal line Sen is in a floating state. At this time, the third transistor T3 is turned on by a high level of the first scanning signal; the first transistor T1 is turned on by a high level of the first node N1; and the fourth transistor T4 is turned on by a high level of the second scanning signal. Thus, a current transmission path is formed, and the current flowing through the first transistor T1 is transmitted to the sensing signal line Sen through the fourth transistor T4, and then is processed by the subsequent detecting circuit. At this time, the sensing signal line Sen is in a floating state. Resistance of the sensing signal line Sen is much less than resistance of the light emitting element L, so there is no current or almost no current in the light emitting element L at this time, and the light emitting element L does not emit light.

After the electrical detecting phase P2, by processed through the subsequent detecting circuit (e.g., the operational amplifier, the analog-to-digital converter, etc.), the current flowing through the first transistor T1 is converted into a voltage signal; then the voltage signal is converted into a digital signal and the obtained signal is stored; the signal is further processed by algorithms to obtain compensation data; thereafter in the normal light emitting phase of the pixel circuit 20, the compensation data obtained by algorithm processing is superimposed on the input display data to obtain compensated display data; and the compensated display data is written by the data writing circuit 22 to control the driving circuit 21, thereby compensating for differences in display brightness uniformity caused by differences in threshold voltage and mobility, etc., of the transistor (the first transistor T1) in the driving circuit 21. The subsequent detecting circuit is not included in the pixel circuit 20 and may be implemented by adopting a conventional circuit structure, and no details will be repeated here.

It should be noted that there is interval time Pt between the detection data writing phase P1 and the electrical detecting phase P2; and the specific length of the interval time Pt is not limited. For example, when the interval time Pt=0, timing of the detection data writing phase P1 and timing of the electrical detecting phase P2 are connected with each other.

It should be noted that in this example, the first scanning signal (supplied by the first scanning line S1) and the second scanning signal (supplied by the second scanning line S2) are a same signal (as illustrated in FIG. 4); but the embodiments of the present disclosure are not limited thereto; the first scanning signal and the second scanning signal may also be different signals, and may have waveforms different from each other, which may be determined according to actual needs.

In the case where the first scanning signal and the second scanning signal are a same signal, in the electrical detecting phase P2, it is still necessary to keep an active detection data signal to prevent leakage of the storage capacitor C1 from affecting turn-on/turn-off degrees of the first transistor T1, and further avoid affecting accuracy of the detection data. In the case where the first scanning signal and the second scanning signal are different signals, in the electrical detecting phase P2, if the first scanning signal is not activated, there is no need to keep an active detection data signal; at this time, the storage capacitor C1 will not leak through the third transistor T3, and thus will neither affect the turn-on/turn-off degrees of the first transistor T1 nor affect accuracy of the detection data.

Figure 5A:
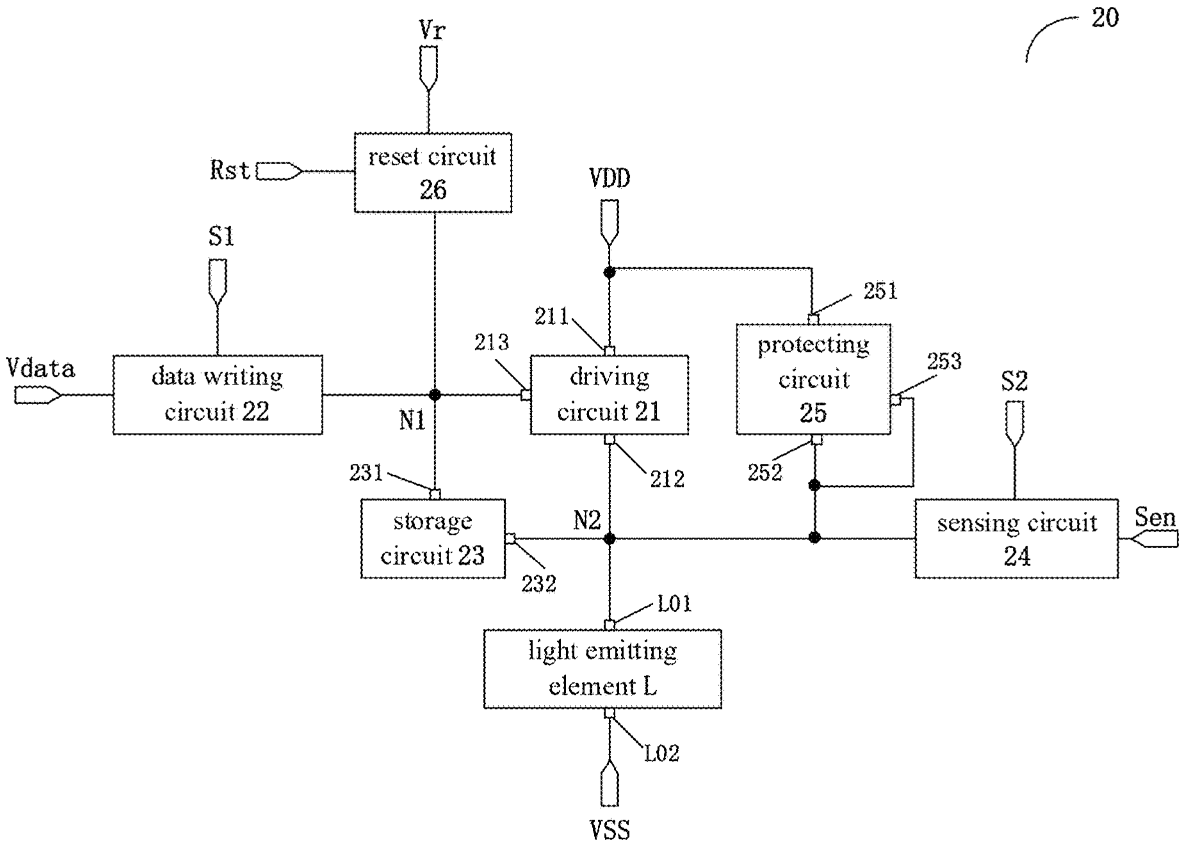
FIG. 5A is a schematic block diagram of a pixel circuit in another display panel provided by some embodiments of the present disclosure.

FIG. 5A is a schematic block diagram of a pixel circuit in another display panel provided by some embodiments of the present disclosure. In some embodiments, as illustrated in FIG. 5A, the pixel circuit 20 may further include a reset circuit 26, and have other structures substantially the same as the pixel circuit 20 illustrated in FIG. 2. The reset circuit 26 is connected with the control terminal 213 of the driving circuit 21 (the first node N1), and is configured to apply a reset voltage to the control terminal 213 of the driving circuit 21 and the first terminal 231 of the storage circuit 23 in response to the reset signal, so that the first node N1 and the respective components connected therewith are reset.

For example, the reset circuit 26 is respectively connected with the first node N1, the reset voltage terminal Vr, and the reset signal line Rst. For example, the reset circuit 26 can be turned on in response to the reset signal supplied by the reset signal line Rst, so that the reset voltage supplied by the reset voltage terminal Vr can be applied to the first node N1, the first terminal 231 of the storage circuit 23, and the control terminal 213 of the driving circuit 21, and thus a reset operation can be performed on the storage circuit 23 and the driving circuit 21, so as to eliminate effect of the previous light emitting phase. The reset voltage may be supplied by an independent reset voltage terminal Vr, and the reset voltage terminal Vr is different from the second voltage terminal VSS.

For example, in some other examples, the reset voltage terminal Vr and the second voltage terminal VSS are a same voltage terminal, and the reset voltage and the second voltage are a same voltage signal. That is, the reset voltage may be supplied by the second voltage terminal VSS (at this time, the second voltage terminal VSS serves as the reset voltage terminal Vr, and the second voltage serves as the reset voltage), and accordingly, the reset circuit 26 is coupled to the second voltage terminal VSS, which is not limited by the embodiments of the present disclosure. For example, the second voltage terminal VSS is a low voltage terminal (the voltage thereof is lower than the voltage of the first voltage terminal VDD), for example, the ground terminal.

Figure 5B:
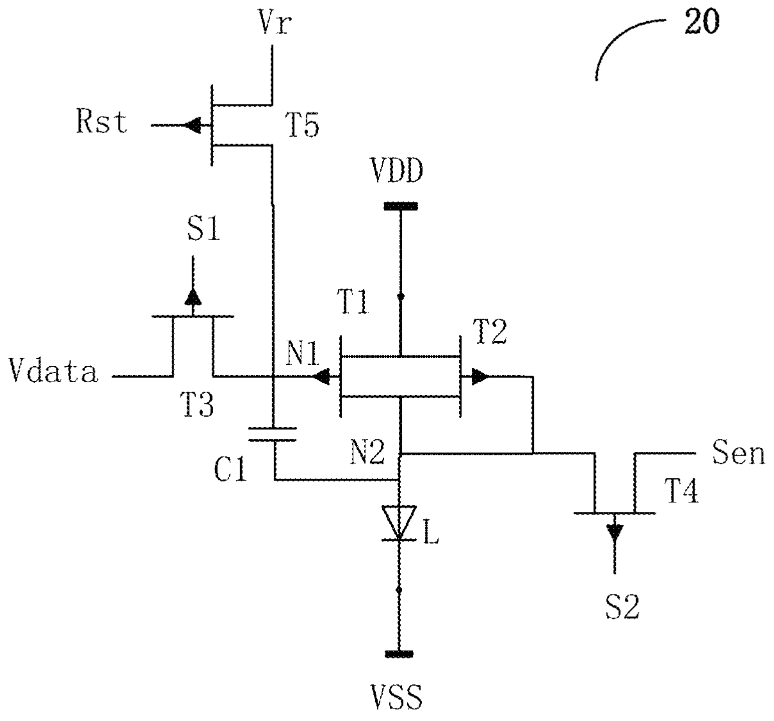
FIG. 5B is a circuit diagram of a specific implementation example of the pixel circuit illustrated in FIG. 5A.

FIG. 5B is a circuit diagram of a specific implementation example of the pixel circuit illustrated in FIG. 5A. The pixel circuit 20 illustrated in FIG. 5B is substantially the same as the pixel circuit 20 illustrated in FIG. 3, but differ in that the pixel circuit 20 illustrated in FIG. 5B further includes a fifth transistor T5 to implement the reset circuit 26.

For example, as illustrated in FIG. 5B, in more detail, the reset circuit 26 may be implemented as the fifth transistor T5. A gate electrode of the fifth transistor T5 is connected with the reset signal line Rst to receive the reset signal. A first electrode of the fifth transistor T5 is connected with the reset voltage terminal Vr to receive the reset voltage. A second electrode of the fifth transistor T5 is connected with the control terminal 213 of the driving circuit 21 (the first node N1), that is, connected with the gate electrode of the first transistor T1. It should be noted that the embodiments of the present disclosure are not limited thereto, and the reset circuit 26 may also be a circuit composed of other components.

It should be noted that in the description of the respective embodiments of the present disclosure, the symbol Vdata may represent both the data line and the level of the data signal. Similarly, the symbol Rst may represent both the reset signal line and the level of the reset signal; the symbol VDD may represent both the first voltage terminal and the first voltage; the symbol VSS may represent both the second voltage terminal and the second voltage; the symbol S1 may represent both the first scanning line and the level of the first scanning signal; the symbol S2 may represent both the second scanning line and the level of the second scanning signal; the symbol Vr may represent both the reset voltage terminal and the reset voltage; and the symbol Sen may represent both the sensing signal line and the level of the signal transmitted on the sensing signal line. The following embodiments are the same in this aspect, and no details will be repeated here.

In the present disclosure, the first node N1 and the second node N2 do not represent actual components, but rather represent junction points of relevant electrical connections in the circuit diagrams.

It should be noted that the pixel circuit 20 provided by the respective embodiments of the present disclosure may further include other circuit structures having an internal compensation function. The internal compensation function may be implemented through voltage compensation, current compensation, or hybrid compensation; the pixel circuit 20 having the internal compensation function, for example, may be a combination of a circuit such as 4T1C or 4T2C with the sensing circuit. For example, in the pixel circuit 20 having the internal compensation function, the data writing circuit 22 and the internal compensating circuit cooperate to write the voltage value carrying the data signal and the threshold voltage information of the driving transistor (the first transistor T1) in the driving circuit 21 into the control terminal 213 of the driving circuit 21 and store the same through the storage circuit 23. For specific examples of the internal compensating circuit, no details will be repeated here. For example, the pixel circuit 20 may further include a light emission control circuit, etc., to implement more comprehensive functionality.

It should be noted that, the transistors adopted in the respective embodiments of the present disclosure may be thin film transistors, field effect transistors, or other switching devices with same characteristics; and the respective embodiments of the present disclosure are described by taking the thin film transistor as an example. A source electrode and a drain electrode of the transistor adopted here may be symmetrical in structure, so the source electrode and the drain electrode of the transistor may be structurally indistinguishable. In the respective embodiments of the present disclosure, in order to distinguish two electrodes of a transistor other than a gate electrode, one electrode is directly described as a first electrode, and the other electrode is described as a second electrode.

Furthermore, it should be noted that the transistors in the pixel circuit 20 illustrated in FIG. 3 and FIG. 5B are illustrated by taking N-type transistors as an example. In this case, the first electrode may be a source electrode and the second electrode may be a drain electrode. The transistors in the pixel circuit 20 may also be P-type transistors only or a mixture of P-type transistors and N-type transistors, and it is only necessary to simultaneously connect port polarities of the selected type of transistor according to port polarities of the corresponding transistor according to the embodiments of the present disclosure. When an N-type transistor is adopted, an active layer of the thin film transistor may be made of indium gallium zinc oxide (IGZO), and as compared with an active layer of the thin film transistor made of low temperature poly silicon (LTPS) or amorphous silicon (e.g., hydrogenated amorphous silicon), may effectively reduce a size of the transistor and prevent leakage current.

It should be noted that in the respective embodiments of the present disclosure, the storage capacitor C1 may be a capacitor device fabricated through a process, for example, the capacitor device is implemented through fabricating specialized capacitor electrodes, the respective electrodes of the capacitor may be implemented through metal layers, semiconductor layers (e.g., doped polysilicon), etc. Moreover, the storage capacitor C1 may also be a parasitic capacitor between respective devices, and may be implemented through the transistor per se and other devices and lines. The connection mode of the storage capacitor C1 is not limited to the mode as described above, but may also be other applicable connection mode, as long as the level written into the first node N1 can be stored.

The pixel circuit 20 provided by the embodiments of the present disclosure can reduce probability of damage to organic light-emitting diode (OLED) devices, play a role in protecting the OLED devices, and prolong the service life of the OLED devices.

During operation, the pixel circuit 20 not only performs a sensing operation in the above-described sensing phase, but also emits light in the display phase to display the image. In the display phase, the driving circuit 21 and the protecting circuit 25 are made jointly supply the drive current, so as to drive the light emitting element L to emit light. The conventional design may be referred to for basic operation modes of the data writing circuit 22, the storage circuit 23, the driving circuit 21, and the light emitting element L in the display phase, and no details will be repeated here.

Taking the pixel circuit 20 illustrated in FIG. 3 as an example, in the flow path of the drive current, not only the first transistor T1 is arranged, but also the second transistor T2 is arranged. The second transistor T2 has a positive feedback function, and supplies the drive current jointly with the first transistor T1. Therefore, as compared with a usual case where the drive current is supplied only by the driving transistor, the channel current of the first transistor T1 in the pixel circuit 20 provided by the embodiments of the present disclosure needs to be appropriately reduced, so that the drive current jointly supplied by the first transistor T1 and the second transistor T2 remains unchanged, so as to cause the light emitting element L to display a required gray scale.

For example, in order to maintain consistency in charge characteristics of the light emitting element L (e.g., the OLED), it is necessary to adjust current-voltage curve characteristics of the first transistor T1, which, for example, may be implemented by changing a channel width-to-length ratio of the first transistor T1. Assuming that the channel width-to-length ratio of a usual driving transistor is 18:6, the channel width-to-length ratio of the first transistor T1 according to the embodiments of the present disclosure may be reduced to 16.5:6. Of course, the embodiments of the present disclosure are not limited thereto. In other examples, the channel width-to-length ratio of the first transistor T1 may be reduced by 10% to 30% as compared with the channel width-to-length ratio of the usual driving transistor. For example, the channel width-to-length ratio of the first transistor T1 ranges from 12.6:6 to 16.2:6, which thus, can reduce the drive current flowing through the first transistor T1 and leave a margin for the drive current generated by the second transistor T2.

It should be noted that the above-described numerical range is only illustrative and not restrictive. The numerical range of the channel width-to-length ratio of the first transistor T1 may also be other specific values, which is not limited in the embodiments of the present disclosure, and may be determined according to actual needs.

Figure 6A:
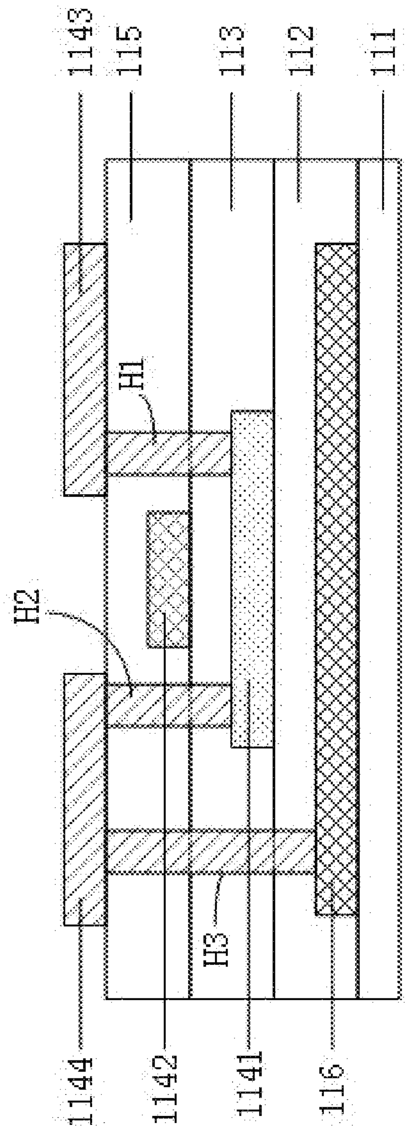
FIG. 6A is a cross-sectional schematic diagram of an array substrate in a display panel provided by some embodiments of the present disclosure.

FIG. 6A is a cross-sectional schematic diagram of an array substrate in a display panel provided by some embodiments of the present disclosure. As illustrated in FIG. 6A, in some embodiments, the array substrate 101 includes a base substrate 111, a buffer layer 112 and a gate insulation layer 113. The first transistor T1 includes an active layer 1141. The buffer layer 112 is arranged on the base substrate 111; the active layer 1141 is arranged on the buffer layer 112; the gate insulation layer 113 is arranged on the buffer layer 112 and covers the active layer 1141; and a gate electrode 1142 of the first transistor T1 is arranged on the gate insulation layer 113.

For example, the array substrate 101 further includes an interlayer insulation layer 115. The interlayer insulation layer 115 is arranged on the gate insulation layer 113 and covers the gate electrode 1142 of the first transistor T1. A first electrode 1143 of the first transistor T1 and a second electrode 1144 of the first transistor T1 are arranged on the interlayer insulation layer 115. Thus, the first transistor T1 forms a top gate structure; the first electrode 1143 and the second electrode 1144 of the first transistor T1 are located in a same layer; and a film layer where the first electrode 1143 and the second 1144 are located is different from a film layer where the gate electrode 1142 is located, so that flexibility of wiring can be improved.

For example, the array substrate 101 further includes a data line Vdata, and the data line Vdata is used for transmitting a data signal. The data line Vdata is arranged on the interlayer insulation layer 115; and the data line Vdata is located in a same layer as the first electrode 1143 of the first transistor T1 and the second electrode 1144 of the first transistor T1, thereby reducing process and improving preparation efficiency.

For example, the first electrode 1143 of the first transistor T1 is connected with the active layer 1141 through a first via hole H1 at least penetrating through the gate insulation layer 113; and the second electrode 1144 of the first transistor T1 is connected with the active layer 1141 through a second via hole H2 at least penetrating through the gate insulation layer 113. In this example, the first via hole H1 penetrates through the gate insulation layer 113 and the interlayer insulation layer 115; and the second via hole H2 also penetrates through the gate insulation layer 113 and the interlayer insulation layer 115. For example, a portion of the active layer 1141 that is exposed by the first via hole H1 and/or the second via hole H2 is a conducting region formed through plasma doping.

For example, in some examples, the array substrate 101 further includes a light shielding layer 116. The light shielding layer 116 is arranged on the base substrate 111; and the buffer layer 112 is arranged on the base substrate 111 and covers the light shielding layer 116. The light shielding layer 116 can prevent stray light from having adverse effects on the active layer 1141. For example, the light shielding layer 116 is made of metal. In some examples, the light shielding layer 116 may be a double-layer metal structure, to reduce resistance and improve impedance characteristics and electromagnetic compatibility characteristics. Of course, the light shielding layer 116 may also be a single-layer metal structure, a three-layer metal structure, or other applicable multi-layer metal structures, which may be determined according to actual needs, and is not limited in the embodiments of the present disclosure.

For example, at least a portion of the light shielding layer 116 serves as the gate electrode of the second transistor T2. For example, a portion of the light shielding layer 116 that overlaps with an active layer of the second transistor T2 (not illustrated in FIG. 6A) serves as the gate electrode of the second transistor T2, so that the first transistor T1 and the second transistor T2 form a vertical double-gate transistor, thereby improving electrical characteristics and simplifying the fabrication process.

For example, in the case where at least a portion of the light shielding layer 116 serves as the gate electrode of the second transistor T2, the first electrode 1143 of the first transistor T1 serves as the first electrode of the second transistor T2, and the second electrode 1144 of the first transistor T1 serves as the second electrode of the second transistor T2. That is, the first electrode 1143 serves both as the first electrode of the first transistor T1 and as the first electrode of the second transistor T2; the second electrode 1144 serves both as the second electrode of the first transistor T1 and as the second electrode of the second transistor T2. The second electrode of the second transistor T2 (i.e., the second electrode 1144 illustrated in FIG. 6A) is connected with the light shielding layer 116 through a third via hole H3 at least penetrating through the buffer layer 112 and the gate insulation layer 113. In this example, the third via hole H3 penetrates through the buffer layer 112, the gate insulation layer 113, and the interlayer insulation layer 115.

Figure 6B:
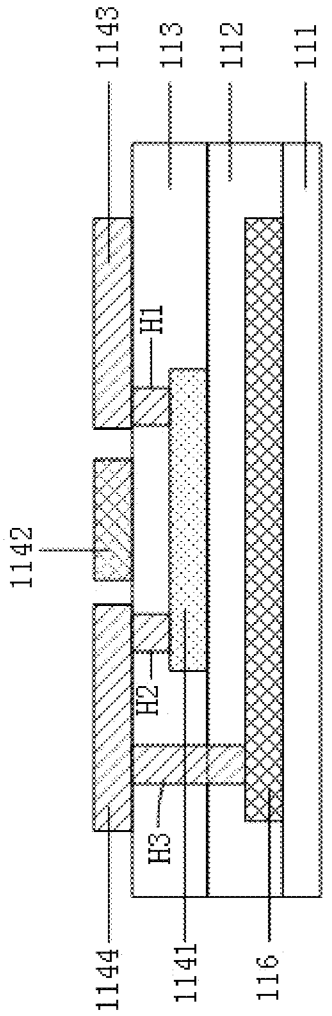
FIG. 6B is a cross-sectional schematic diagram of an array substrate in another display panel provided by some embodiments of the present disclosure.

FIG. 6B is a cross-sectional schematic diagram of an array substrate in another display panel provided by some embodiments of the present disclosure. As illustrated in FIG. 6B, in some embodiments, the array substrate 101 includes a base substrate 111, a buffer layer 112 and a gate insulation layer 113. The first transistor T1 includes an active layer 1141. The buffer layer 112 is arranged on the base substrate 111; the active layer 1141 is arranged on the buffer layer 112; the gate insulation layer 113 is arranged on the buffer layer 112 and covers the active layer 1141; and the gate electrode 1142 of the first transistor T1 is arranged on the gate insulation layer 113. For example, the first electrode 1143 of the first transistor T1 and the second electrode 1144 of the first transistor T1 are arranged on the gate insulation layer 113; the first electrode 1143 of the first transistor T1, the second electrode 1144 of the first transistor T1, and the gate electrode 1142 of the first transistor T1 are located in a same layer. Thus, the first transistor T1 forms a top gate structure; the first electrode 1143, the second electrode 1144, and the gate electrode 1142 of the first transistor T1 are located in a same layer, for example, all located in a gate metal layer, which thus, can reduce the thickness of the array substrate 101, reduce the number of film layers, and facilitate thinning of the array substrate 101.

For example, the array substrate 101 further includes a data line Vdata, and the data line Vdata is used for transmitting a data signal. The data line Vdata is arranged on the gate insulation layer 113; and the data line Vdata is located in a same layer as the gate electrode 1142 of the first transistor T1, the first electrode 1143 of the first transistor T1, and the second electrode 1144 of the first transistor T1, thereby reducing process and improving preparation efficiency.

It should be noted that although the first electrode 1143, the second electrode 1144, and the gate electrode 1142 of the first transistor T1 are located in a same layer, yet the first electrode 1143, the second electrode 1144, and the gate electrode 1142 are separated from each other and not directly connected with each other, so as to avoid short circuits. Except for absence of the interlayer insulation layer 115, the other components of the film layer structure illustrated in FIG. 6B are substantially the same as the film layer structure illustrated in FIG. 6A. The above relevant description may be referred to for relevant illustration, and no details will be repeated here.

Figure 7:
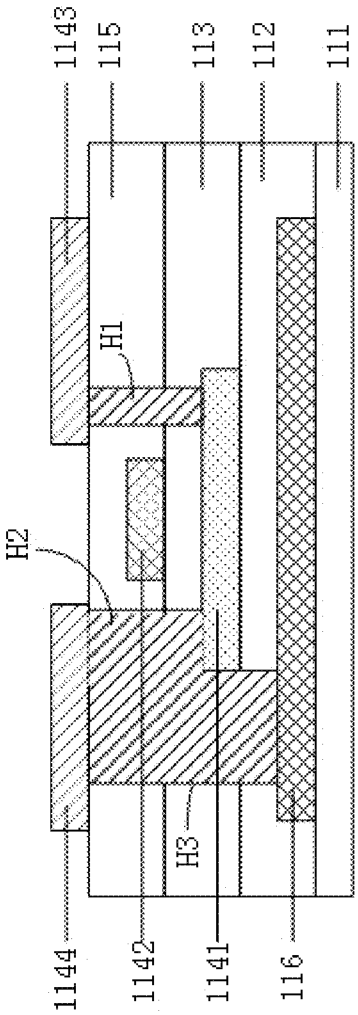
FIG. 7 is a cross-sectional schematic diagram of an array substrate in still another display panel provided by some embodiments of the present disclosure.

FIG. 7 is a cross-sectional schematic diagram of an array substrate in another display panel provided by some embodiments of the present disclosure. In some embodiments, as illustrated in FIG. 7, one of the first electrode 1143 of the first transistor T1 and the second electrode 1144 of the first transistor T1 is a drain electrode of the first transistor T1; and one of the first via hole H1 and the second via hole H2 that is adjacent to the drain electrode of the first transistor T1 is the same via hole as the third via hole H3. In this example, the second electrode 1144 of the first transistor T1 is the drain electrode; the via hole which is adjacent to the drain electrode is the second via hole H2; and the second via hole H2 and the third via hole H3 are the same one via hole, that is, the second via hole H2 and the third via hole H3 are in communication with each other, jointly forming one via hole. Therefore, the preparation process can be simplified. For example, the drain electrode of the first transistor T1 (i.e., the second electrode 1144) is connected with both the exposed portion of the active layer 1141 and the exposed portion of the light shielding layer 116 through the third via hole H3, so as to implement the connection mode of the circuit structure illustrated in FIG. 3. Except for the arrangement mode of the second via hole H2 and the third via hole H3, the other components of the film layer structure illustrated in FIG. 7 are substantially the same as the film layer structure illustrated in FIG. 6A. The above relevant description may be referred to for relevant illustration, and no details will be repeated here.

Figure 8:
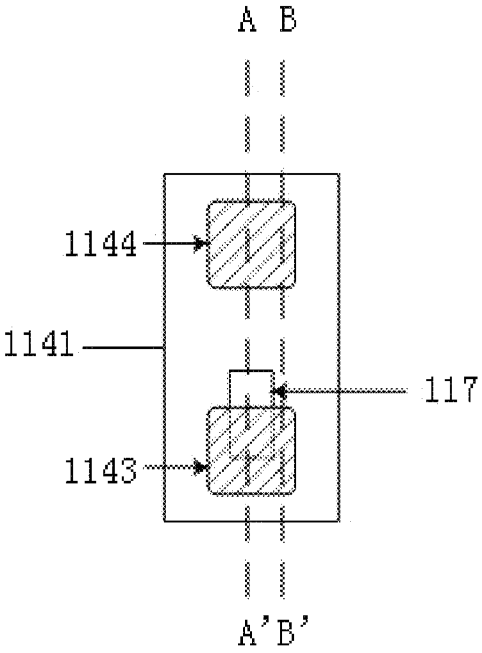
FIG. 8 is a schematic plan view of an active layer in a display panel provided by some embodiments of the present disclosure.

FIG. 8 is a schematic plan view of an active layer in a display panel provided by some embodiments of the present disclosure. In some embodiments, as illustrated in FIG. 8, the active layer 1141 includes at least one grooved region 117. The grooved region 117 is a hole that penetrates through the active layer 1141 in a direction perpendicular to the base substrate 111. In the example illustrated in FIG. 8, the number of grooved region 117 included in the active layer 1141 is 1, that is, the active layer 1141 includes one grooved region 117.

One of the first electrode 1143 of the first transistor T1 and the second electrode 1144 of the first transistor T1 is the source electrode of the first transistor T1. One of the first via hole H1 and the second via hole H2 that is adjacent to the source electrode of the first transistor T1 is a target via hole; and the grooved region 117 is adjacent to the target via hole. In this example, the first electrode 1143 of the first transistor T1 is the source electrode, and the first via hole H1 is a via hole that is adjacent to the source electrode of the first transistor T1. Therefore, the first via hole H1 is the target via hole, and the grooved region 117 is adjacent to the first via hole H1.

For example, the shape of the grooved region 117 is a rectangle. Of course, the embodiments of the present disclosure are not limited thereto. The shape of the grooved region 117 may also be any shape such as a square, a trapezoid, a circle, an ellipse, an irregular polygon, etc., which may be determined according to actual needs, and is not limited in the embodiments of the present disclosure.

Figure 9A:
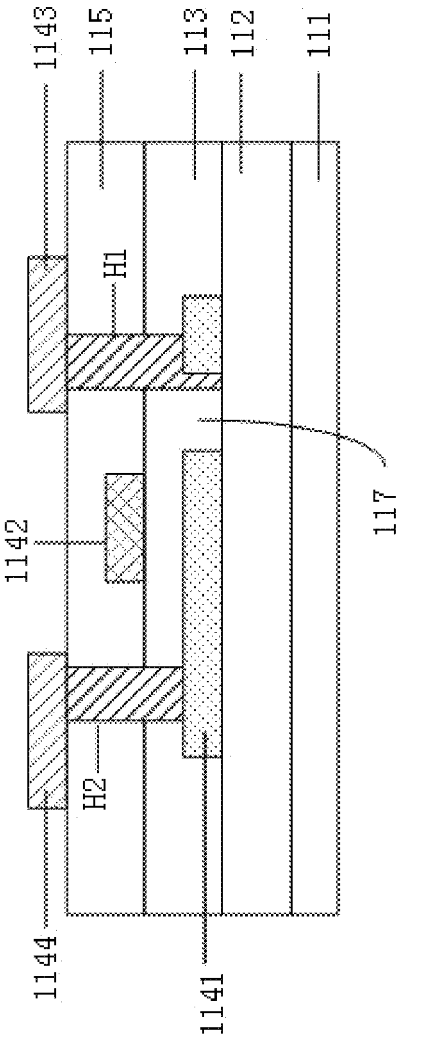
FIG. 9A is a cross-sectional schematic diagram of line A-A' in FIG. 8.
Figure 9B:
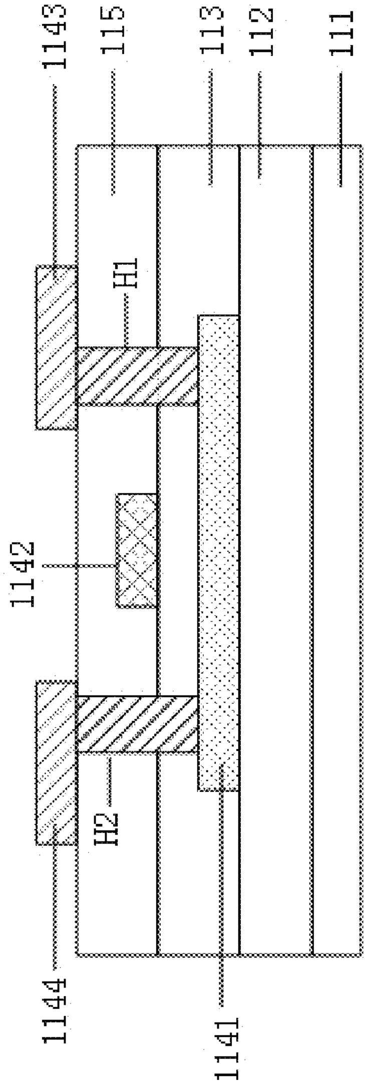
FIG. 9B is a cross-sectional schematic diagram of line B-B' in FIG. 8.

FIG. 9A is a cross-sectional schematic diagram of line A-A' in FIG. 8; and FIG. 9B is a cross-sectional schematic diagram of line B-B' in FIG. 8. In conjunction with FIG. 8, FIG. 9A and FIG. 9B, the grooved region 117 is adjacent to the first via hole H1, that is, the grooved region 117 is arranged at one end of the active layer 1141 close to the first via hole H1. The grooved region 117 is a hole that penetrates through the active layer 1141 in the direction perpendicular to the base substrate 111, that is, within the grooved region 117, the active layer 1141 is missing due to being grooved. In positions other than the grooved region 117, the active layer 1141 is not grooved and is thus continuous. For example, the target via hole (the first via hole H1) exposes a portion of the active layer 1141, and exposes a portion of the buffer layer 112 through the grooved region 117. It should be noted that in FIG. 9A and FIG. 9B, the light shielding layer 116 is not illustrated, which is for simplicity only and does not constitute a limitation on the embodiments of the present disclosure.

By arranging the grooved region 117 in the active layer 1141, some portions of the active layer 1141 are disconnected, so that a channel current of the first transistor T1 is reduced while keeping the channel shape/width-to-length ratio of the first transistor T1 unchanged, and the reduced current is compensated by the second transistor T2 of the protecting circuit 25 through positive feedback, so that the drive current jointly supplied by the first transistor T1 and the second transistor T2 meets an expected magnitude. Since the channel shape/width-to-length ratio of the first transistor T1 is unchanged, the change degree of layout design can be minimized to reduce workload of layout design.

Figure 10:
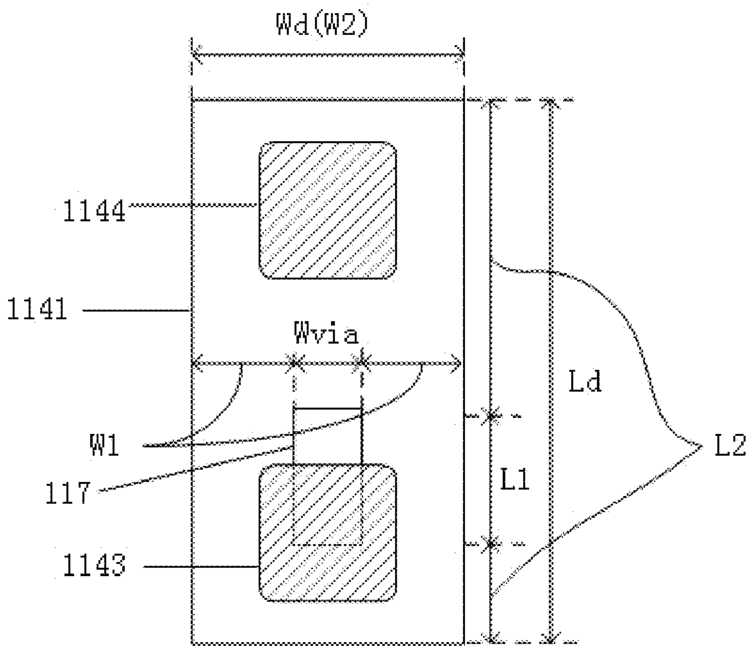
FIG. 10 is a schematic diagram of annotation of respective sizes of the active layer illustrated in FIG. 8.

FIG. 10 is a schematic diagram of annotation of respective sizes of the active layer illustrated in FIG. 8. As illustrated in FIG. 10, a reference width of the active layer 1141 is Wd, and the reference width Wd is a width of the active layer in the case of non-grooving and supplying the drive current only by the first transistor T1. A width of the grooved region 117 is Wvia, an effective width of the active layer 1141 in a position of the grooved region 117 is W1, and an effective width of the active layer 1141 in a non-grooved position is W2, W2=Wd. For example, W1=Wd-Wvia. A reference length of the active layer 1141 is Ld, and the reference length Ld is a length of the active layer in the case of non-grooving and supplying the drive current only by the first transistor T1. A length of the grooved region 117 is L1, and an effective length of the active layer 117 in a non-grooved position is L2, Ld=L1+L2.

For example, current integration calculation is performed on the first transistor T1 (the first transistor T1 is already grooved) according to the thin film transistor current integration principle, with a formula as follows:

$$\int_0^{Ld}\frac{Idy}{Wd}=I\left(\frac{L1}{W1}+\frac{L2}{W2}\right)=\mu*Cgi\left[(Vgs-Vth)Vds-\frac{1}{2}Vds^2\right] \quad (1\text{-}1)$$

Where, μ is carrier mobility, Cgi is a dielectric constant of the gate insulation layer, Vgs is a gate source voltage, Vth is a threshold voltage, and Vds is a drain source voltage. For example, these electrical parameters may be set to same constant values for channel designs of both grooving and non-grooving. For example, I and dy are independent variables for integral calculation.

For example, integration calculation is performed on a non-grooved transistor (the first transistor T1 having not been grooved), with a formula as follows:

$$\int_0^{Ld}\frac{Idy}{Wd}=I\frac{Ld}{Wd}=\mu*Cgi\left[(Vgs-Vth)Vds-\frac{1}{2}Vds^2\right] \tag{1-2}$$

For example, a preset channel current of the first transistor T1 is represented as I1, and the preset channel current I1 is a channel current in the case of non-grooving and supplying the drive current only by the first transistor T1. A grooving channel current of the first transistor T1 is represented as I2, and the grooving channel current I2 is a channel current of the first transistor T1 having been grooved. The grooving channel current I2 corresponds to the above-described formula (1-1), and the preset channel current I1 corresponds to the above-described formula (1-2). Therefore, according to the above-described formulas (1-1) and (1-2), a ratio of I2 to I1 can be obtained, which satisfies a formula as follows:

$$\frac{I2}{I1}=\frac{Wd}{Ld}\left(\frac{L1}{W1}+\frac{L2}{W2}\right).$$

For example, the numerical range of I2/I1 is from 1 to 1.5, that is, a ratio range of the above-described formula is from 1 to 1.5, which thus, can prevent current loss caused by grooving in the channel from being too great, keep the current loss within 50%, and prevent the size of the grooved region 117 from being too large, so as to avoid effect of the grooved region 117 on stability of the layer structure and stability of circuit characteristics.

For example, an initial channel current of the first transistor T1 is represented as Id. For example, the initial channel current Id of the first transistor T1 is equal to the grooving channel current I2 of the first transistor T1, that is, the initial channel current Id of the first transistor T1 is equal to the channel current in the case where the first transistor T1 is already grooved. Therefore, the initial channel current Id corresponds to the above-described formula (1-1).

For example, a channel width of the second transistor T2 is W3, and a channel length of the second transistor T2 is L3. Current integration calculation is performed on the second transistor T2 with a formula as follows:

$$\int_0^{L3}\frac{Idy}{W3}=I\frac{L3}{W3}=\mu*Cbuf\left[(Vgs-Vth)Vds-\frac{1}{2}Vds^2\right] \tag{1-3}$$

Where, Cbuf is capacitance of the gate insulation layer of the second transistor T2. Since the light shielding layer 116 serves as the gate electrode of the second transistor T2, the capacitance Cbuf of the gate insulation layer of the second transistor T2 is capacitance of the buffer layer 112.

For example, a thickness of the buffer layer 112 is dbuf, and a thickness of the gate insulation layer 113 is dgi. Since the gate insulation layer of the second transistor T2 is made of silicon nitride (SiN), both the buffer layer 112 and the gate insulation layer 113 are made of SiN, thus they have a same dielectric constant and a same channel unit area; but these film layers have different thicknesses. Therefore, according to a capacitance calculation formula C=ε*A/d (where ε represents the dielectric constant, A represents the channel unit area, d represents the thickness, and C represents the capacitance), it may be inferred that, a ratio of Cgi to Cbuf is equal to an inverse ratio of thicknesses thereof, that is, equal to dbuf/dgi.

For example, a channel current of the second transistor T2 is Ie. Based on the above-described formulas (1-1) and (1-3) as well as the inference about the capacitance ratio, Ie and Id satisfy a formula as follows:

$$\frac{Id}{Ie}=\frac{W3}{L3}\left(\frac{L1}{W1}+\frac{L2}{W2}\right)\frac{dgi}{dbuf}.$$

For example, the numerical range of Id/Ie is from 0.5 to 1, that is, the ratio range of the above-described formula is from 0.5 to 1; and the above-described ratio at least reaches 50% or more. Therefore, the second transistor T2 connected in parallel with the first transistor T1 can supplement the drive current of the first transistor T1 that is reduced due to grooving, thereby keeping the charge characteristics unchanged.

For example, the numerical range of I2/I1 is from 1 to 1.5, and the numerical range of Id/Ie is from 0.5 to 1, so that the size of the groove formed in the channel of the first transistor T1 is not too large, which may not cause excessive current loss. The current loss ratio is within 50%. The second transistor T2 connected in parallel serves as a vertical double-gate transistor of the first transistor T1, which may supplement the current, and the ratio of Id/Ie at least reaches 50% or more. Thus, the entire circuit can achieve good electrical characteristics.

For example, in some examples, respective parameters are measured. With respect to the first transistor T1, W1=27.7 μm, L1=Ld–L2=35 μm, Ld=40 μm, W2=(10.7–4.4) μm=6.3 μm, Wd=27.7 μm, L2=4.7 μm, Wvia=4.4 μm. With respect to the second transistor T2, W3=27.7 μm, L3=28 μm. The thickness of the gate insulation layer 113 is dgi=0.166 μm, and the thickness of the buffer layer 112 is dbuf=0.37 μm.

By calculation, it is obtained that:

$$\frac{Wd}{Ld}\left(\frac{L1}{W1}+\frac{L2}{W2}\right)=1.4,$$

and the value is within the range of 1 to 1.5.

By calculation, it is obtained that;

$$\frac{W3}{L3}\left(\frac{L1}{W1}+\frac{L2}{W2}\right)\frac{dgi}{dbuf}=0.89,$$

and the value is within the range of 0.5 to 1.

For example, in some other examples, respective parameters are designed as follows. With respect to the first transistor T1, W1=16.84 μm, L1=Ld–L2=29 μm, Ld=31.43 μm, W2=12.19 μm, Wd=16.84 μm, L2=2.39 μm, Wvia=4.65 μm. With respect to the second transistor T2, W3=16.84 μm, L3=28 μm. The thickness of the gate insulation layer 113 is dgi=0.166 μm, and the thickness of the buffer layer 112 is dbuf=0.37 μm.

By calculation, it is obtained that:

$$\frac{Wd}{Ld}\left(\frac{L1}{W1}+\frac{L2}{W2}\right)=1.03,$$

and the value is within the range of 1 to 1.5.

By calculation, it is obtained that:

$$\frac{W3}{L3}\left(\frac{L1}{W1}+\frac{L2}{W2}\right)\frac{dgi}{dbuf}=0.51,$$

and the value is within the range of 0.5 to 1.

By comparing this example with the above-described example, it can be seen that the display screen size in this example is less than the display screen size of the above-described example; the area of a single OLED pixel unit (or sub-pixel) is smaller. Reduction of an effective display area of the organic light-emitting material leads to decrease in the drive current as well as decrease in the channel width-to-length ratio and the channel area of the driving transistor (the first transistor T1), reduction of the channel size leads to decrease in a channel grooving size (the size of the grooved region), and as the size decreases, requirements for process yield (process size deviation and process size alignment) increases accordingly (e.g., a same 2-micron deviation accounts for 1/15 of a 30-micron feature size, while accounts for 1/5 of a 10-micron feature size with greater effect). Therefore, in this example, a proportion of channel grooving (the grooved region) in the channel and effect thereof on current loss are reduced. After the pixel size is reduced, in order to ensure the aperture ratio, an area of metal of the light shielding layer (the light shielding layer 116 serving as the gate electrode of the second transistor T2 connected in parallel) is also reduced, so that supplementary current of the second transistor T2 connected in parallel is reduced accordingly. Therefore, a maximum value range and a minimum value range respectively set for the two current ratios I2/I1 and Id/Ie can be adapted to different drive current requirements caused by different sizes of display screens and different organic light-emitting materials, as well as design requirements for different pixel sizes and different transistor sizes.

Figure 11:
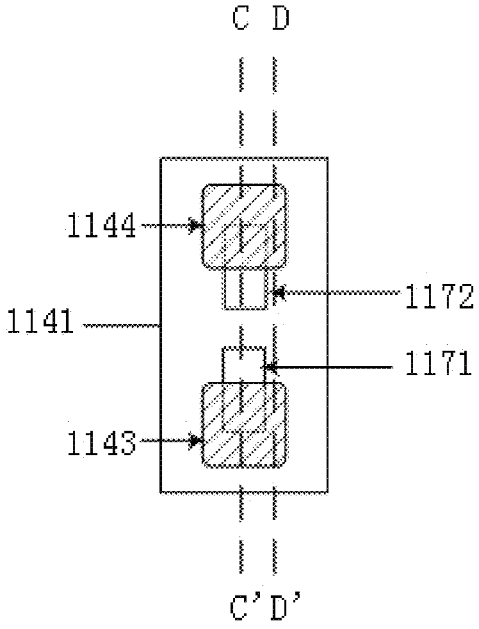
FIG. 11 is a schematic plan view of an active layer in another display panel provided by some embodiments of the present disclosure.
Figure 12A:
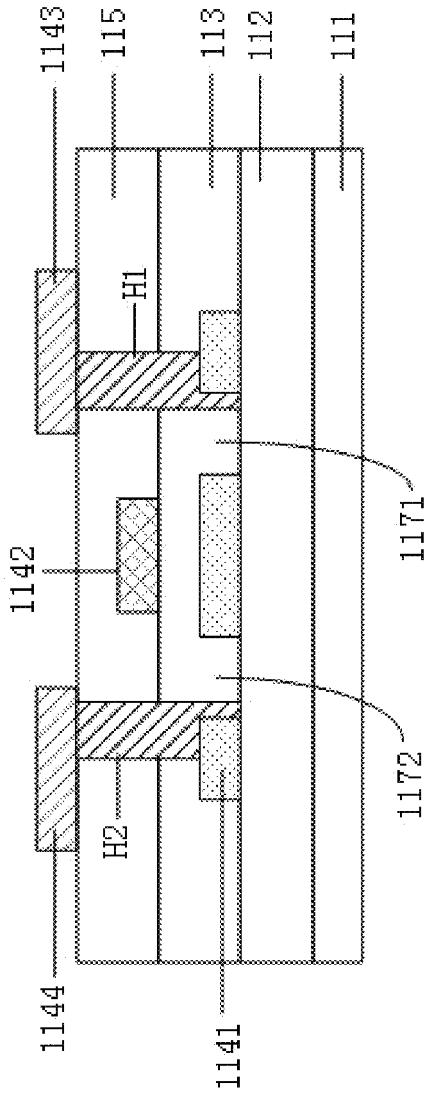
FIG. 12A is a cross-sectional schematic diagram of line C-C' in FIG. 11.
Figure 12B:
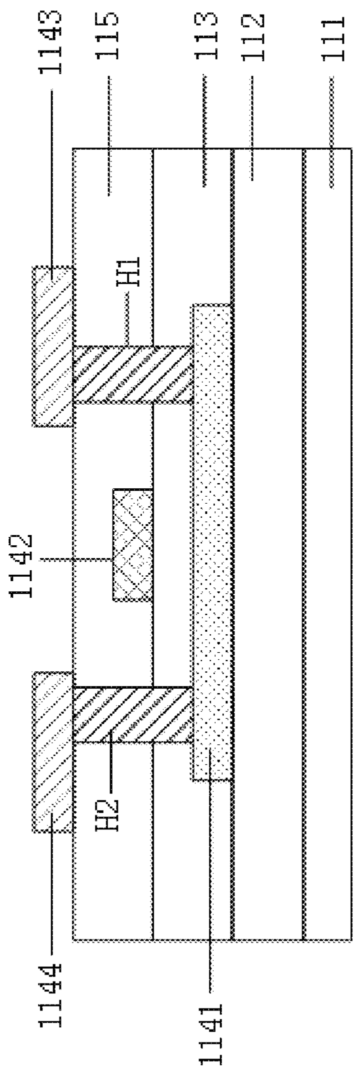
FIG. 12B is a cross-sectional schematic diagram of line D-D' in FIG. 11.

FIG. 11 is a schematic plan view of an active layer in another display panel provided by some embodiments of the present disclosure; FIG. 12A is a cross-sectional schematic diagram of line C-C' in FIG. 11; and FIG. 12B is a cross-sectional schematic diagram of line D-D' in FIG. 11. As illustrated in FIG. 11, FIG. 12A and FIG. 12B, in some embodiments, the grooved region 117 includes two grooved regions, that is, a first grooved region 1171 and a second grooved region 1172. The first grooved region 1171 is adjacent to the first via hole H1; and the second grooved region 1172 is adjacent to the second via hole H2. In this example, both the source electrode and the drain electrode of the first transistor T1 are each provided with a grooved region, which may further reduce the drive current supplied by the first transistor T1.

The first grooved region 1171 and the second grooved region 1172 are holes that penetrate through the active layer 1141 in the direction perpendicular to the base substrate 111, that is, within the first grooved region 1171 and the second grooved region 1172, the active layer 1141 is missing due to being grooved. In positions other than the first grooved region 1171 and the second grooved region 1172, the active layer 1141 is not grooved and is thus continuous. It should be noted that in FIG. 12A and FIG. 12B, the light shielding layer 116 is not illustrated, which is for simplicity only and does not constitute a limitation on the embodiments of the present disclosure.

For example, the first via hole H1 exposes a portion of the active layer 1141, and exposes a portion of the buffer layer 112 through the first grooved region 1171; and/or, the second via hole H2 exposes a portion of the active layer 1141, and exposes a portion of the buffer layer 112 through the second grooved region 1172. In some examples, shapes of the first grooved region 1171 and the second grooved region 1172 are both rectangles. Of course, the embodiments of the present disclosure are not limited thereto. The shapes of the first grooved region 1171 and the second grooved region 1172 may also be any shape such as squares, trapezoids, circles, ellipses, irregular polygons, etc., which may be determined according to actual needs, and are not limited in the embodiments of the present disclosure. The shape of the first grooved region 1171 and the shape of the second grooved region 1172 may be the same or different.

For example, the first grooved region 1171 has a same size as that of the second grooved region 1172. Here, having a same size may refer to having a same shape with respective sides of a same length, or may also refer to having a same area. Of course, the embodiments of the present disclosure are not limited thereto. The first grooved region 1171 and the second grooved region 1172 may also have different sizes. For example, one of the first grooved region 1171 and the second grooved region 1172 has a larger size, while the other of the first grooved region 1171 and the second grooved region 1172 has a smaller size, which may be determined according to actual needs, and is not limited in the embodiments of the present disclosure. For example, the first grooved region 1171 and the second grooved region 1172 may be symmetrically arranged, for example, the two are axisymmetric.

By arranging the first grooved region 1171 and the second grooved region 1172 in the active layer 1141, some portions of the active layer 1141 are disconnected, so that a channel current of the first transistor T1 can be reduced while keeping a channel shape/width-to-length ratio of the first transistor T1 unchanged. The reduced current is compensated by the second transistor T2 of the protecting circuit 25 through positive feedback, so that the drive current jointly supplied by the first transistor T1 and the second transistor T2 meets an expected magnitude. Since the channel shape/width-to-length ratio of the first transistor T1 is unchanged, the change degree of layout design can be minimized to reduce workload of layout design. As compared with the example in which only one grooved region is arranged, in this example, two grooved regions (the first grooved region 1171 and the second grooved region 1172) are arranged thus further making the current of the first transistor T1 reduced. For example, in the case of two grooved regions, the above-described calculation formula for the channel current of one grooved region is still applicable, and no details will be repeated here.

Figure 13A:
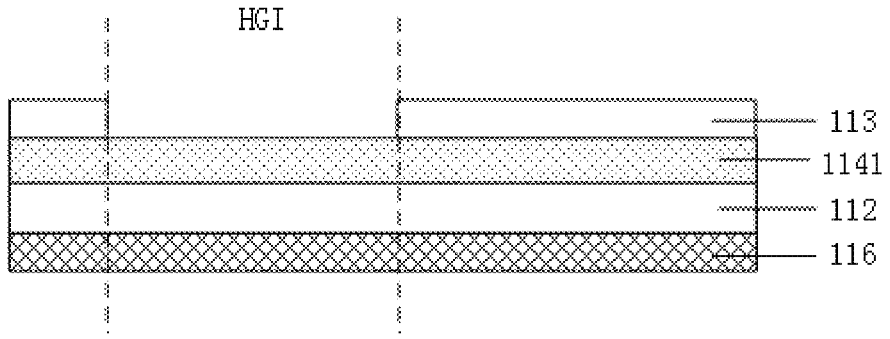
FIG. 13A to FIG. 13C are schematic diagrams of an etching process for an array substrate in a display panel provided by some embodiments of the present disclosure.
Figure 13B:
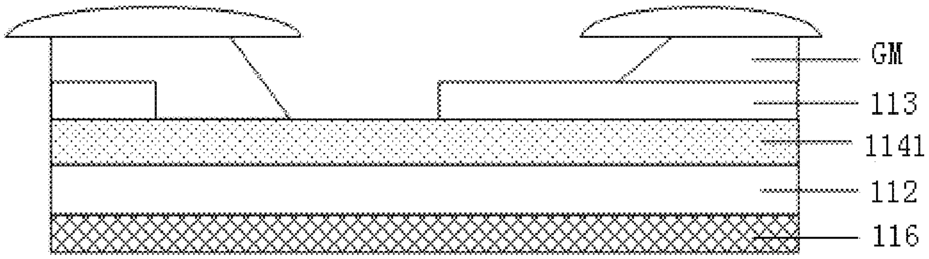
Figure 13C:
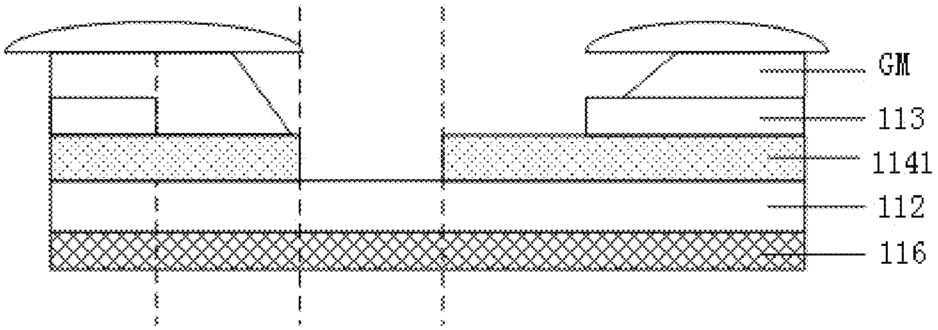

FIG. 13A to FIG. 13C are schematic diagrams of an etching process for an array substrate in a display panel provided by some embodiments of the present disclosure. By performing the process operations illustrated in FIG. 13A to FIG. 13C, a portion of the active layer 1141 can be etched, so that the active layer 1141 is disconnected at the via hole, to form a grooved region; and the portion of the active layer 1141 that is located at the via hole is disconnected, so that the via hole exposes a portion of the active layer 1141 and exposes a portion of the buffer layer 112. For example, the active layer 1141 is made of IGZO oxide.

As illustrated in FIG. 13A, after the gate insulation layer 113 is masked, an etching process is carried out, so that an initial via hole HGI can be formed in the gate insulation layer 113. Meanwhile, IGZO inside the hole needs to undergo a conducting process to improve electrical conductivity. At this time, IGZO serving as the active layer 1141 is not disconnected, and the active layer 1141 is continuous. Since the gate insulation layer 113 needs to be etched through, over etch (OE) at this time has a great degree. As illustrated in FIG. 13B, the gate metal layer GM is coated and patterned. For example, the gate metal layer GM is used for forming structures such as the gate electrode 1142 or the like. The entire surface of the gate insulation layer 113 is etched by using a self-alignment process, to form a GI tail, and undergoes an IGZO conducting treatment. As illustrated in FIG. 13C, since the overlapping region has IGZO undergone 2 times of etching and 2 times of conduction treatments, IGZO in the overlapping region is missing, thereby forming the grooved region. It should be noted that this does not affect signal transmission.

Figure 14:
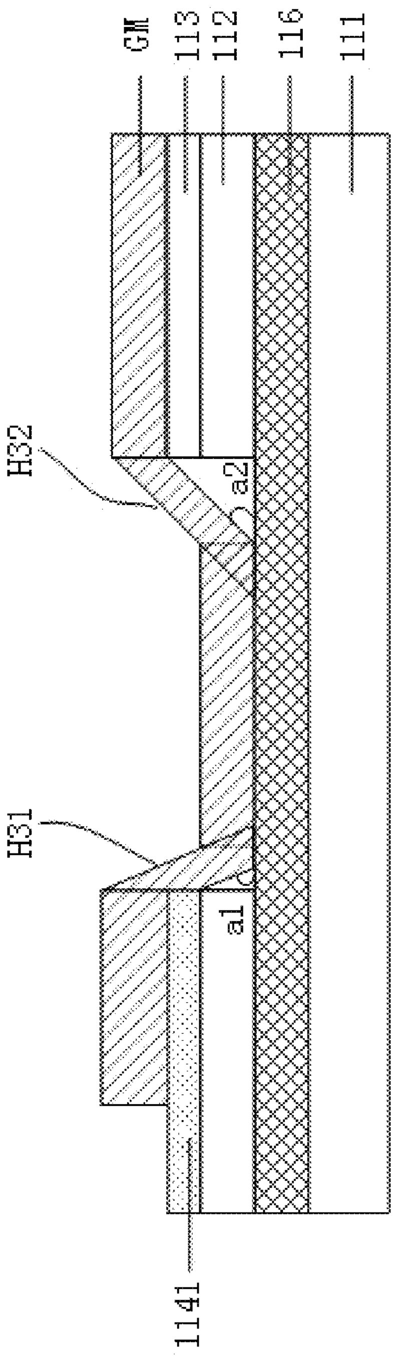
FIG. 14 is a cross-sectional schematic diagram of an array substrate in a display panel provided by some embodiments of the present disclosure.

FIG. 14 is a cross-sectional schematic diagram of an array substrate in a display panel provided by some embodiments of the present disclosure. As illustrated in FIG. 14, the third via hole H3 has a first sidewall H31 and a second sidewall H32 opposite to each other; the first sidewall H31 is close to the active layer 1141; and the second sidewall H32 is away from the active layer 1141. For example, a slope of the first sidewall H31 is different from a slope of the second sidewall H32. In some examples, the slope of the first sidewall H31 is greater than the slope of the second sidewall H32. Here, the slope refers to a degree of steepness of the first sidewall H31 and the second sidewall H32, and may be a tangent value of a slope angle. For example, a slope angle of the first sidewall H31 is a1, a slope angle of the second sidewall H32 is a2, a1>a2, tan (a1)>tan (a2), and the slope of the first sidewall H31 is greater than the slope of the second sidewall H32.

For example, the third via hole H3 is a via hole that connects the second electrode of the second transistor T2 (the second electrode 1143 of the first transistor T1 may serve as the second electrode of the second transistor T2) and the light shielding layer 116 serving as the gate electrode of the second transistor T2. Since etching thicknesses on both sides are different, one side of the third via hole H3 only has the buffer layer 112 over etched, making the slope steeper (i.e., making the slope of the first sidewall H31 steeper), which is favorable for increasing and balancing a contact area between the gate metal layer GM and the light shielding layer 116. The other side of the third via hole H3 has the buffer layer 112 and gate insulation layer 113 etched, making the slope less steep (i.e., making the slope of the second sidewall H32 less steep), which is favorable for climbing of the metal material adhering to the second sidewall H32.

Figure 15:
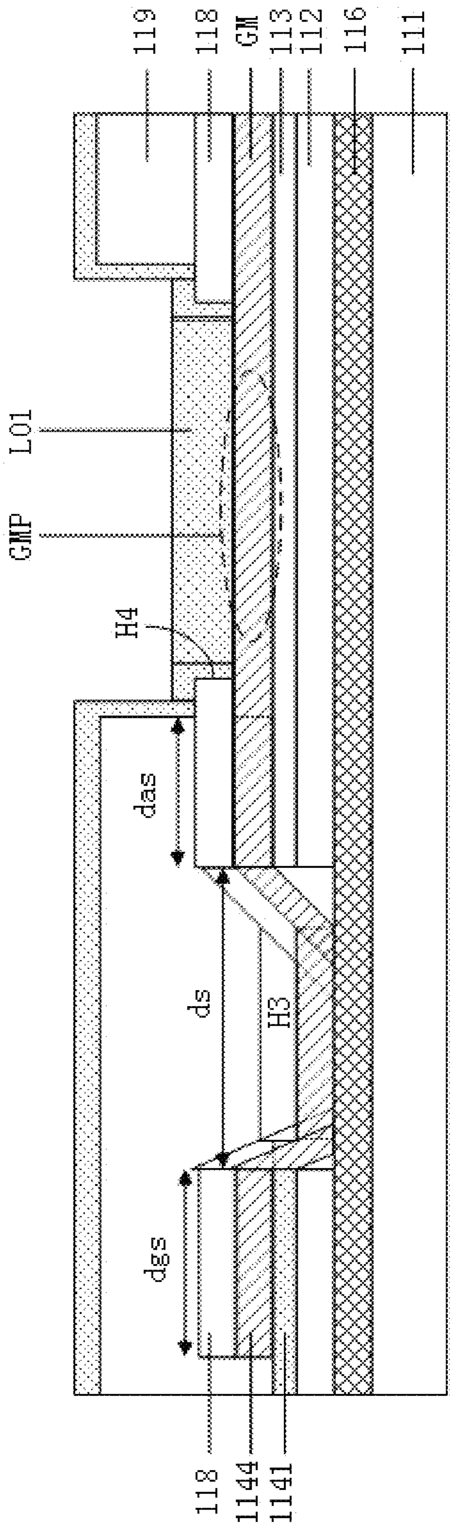
FIG. 15 is a cross-sectional schematic diagram of an array substrate in another display panel provided by some embodiments of the present disclosure.

FIG. 15 is a cross-sectional schematic diagram of an array substrate in another display panel provided by some embodiments of the present disclosure. As illustrated in FIG. 15, the array substrate 101 further includes a gate metal layer GM, a passivation layer 118, and a planarization layer 119. The gate metal layer GM is arranged on the gate insulation layer 113, and the passivation layer 118 and the planarization layer 119 are sequentially stacked. For example, in the case where the gate electrode 1142 of the first transistor T1, the first electrode 1143 of the first transistor T1, and the second electrode 1144 of the first transistor T1 are arranged in a same layer, the gate electrode 1142 of the first transistor T1, the first electrode 1143 of the first transistor T1, and the second electrode 1144 of the first transistor T1 are all located in the gate metal layer GM. For example, in the case where the gate electrode 1142 of the first transistor T1, the first electrode 1143 of the first transistor T1, and the second electrode 1144 of the first transistor T1 are arranged in different layers, the gate electrode 1142 of the first transistor T1 is located in the gate metal layer GM.

For example, the passivation layer 118 is arranged on the gate metal layer GM. The first terminal L01 of the light emitting element L is an anode, the anode is connected with a transfer portion GMP located in the gate metal layer GM through the fourth via hole H4 penetrating through the passivation layer 118, and the transfer portion GMP is connected with the light shielding layer 116 and the second electrode 1144 of the first transistor T1 through the third via hole H3.

For example, a distance between edges of the fourth via hole H4 and the third via hole H3 that are close to each other is das, an aperture of the third via hole H3 in the plane where the gate metal layer GM is located is ds, and das and ds satisfy a relationship as follows:

$$\frac{|das - ds|}{ds} \leq 0.3.$$

For example, in some examples, das=ds, that is, the distance between the edges of the fourth via hole H4 and the third via hole H3 that are close to each other is equal to the aperture of the third via hole H3 in the plane where the gate metal layer GM is located.

By ensuring the distance das between the edges of the fourth via hole H4 and the third via hole H3 that are close to each other and the aperture ds of the third via hole H3 in the plane where the gate metal layer GM is located to satisfy the above-described relationship, it is favorable for reducing non-uniformity of edge exposure caused by thickness non-uniformity when photoetching the planarization layer 119, so that similar process deviations can be reduced.

For example, a distance between an edge of the second electrode 1144 of the first transistor T1 away from the third via hole H3 and an edge of the second electrode 1144 of the first transistor T1 close to the third via hole H3 is dgs, the aperture of the third via hole H3 in the plane where the gate metal layer GM is located is ds, and dgs and ds satisfy a relationship as follows:

$$\frac{|dgs - ds|}{ds} \leq 0.3.$$

For example, in some examples, dgs=ds, that is, the distance between the edge of the second electrode 1144 of the first transistor T1 away from the third via hole H3 and the edge of the second electrode 1144 of the first transistor T1 close to the third via hole H3 is equal to the aperture of the third via hole H3 in the plane where the gate metal layer GM is located.

By ensuring the distance dgs between the edge of the second electrode 1144 of the first transistor T1 away from the third via hole H3 and the edge of the second electrode 1144 of the first transistor T1 close to the third via hole H3 and the aperture ds of the third via hole H3 in the plane where the gate metal layer GM is located to satisfy the above-described relationship, it is favorable for reducing non-uniformity of edge exposure caused by thickness non-uniformity when photoetching the planarization layer 119, so that similar process deviations can be reduced.

For example, in some examples, the distance das between the edges of the fourth via hole H4 and the third via hole H3 that are close to each other, the aperture ds of the third via hole H3 in the plane where the gate metal layer GM is located, and the distance dgs between the edge of the second electrode 1144 of the first transistor T1 away from the third via hole H3 and the edge of the second electrode 1144 of the first transistor T1 close to the third via hole H3 are all equal, that is, das=ds=dgs, which, thus, can more effectively reduce non-uniformity of edge exposure caused by thickness non-uniformity when photoetching the planarization layer 119. Of course, the embodiments of the present disclosure are not limited thereto, there may also be: das=ds only, while dgsds; or, dgs=ds only, while das¥ds, which may be determined according to actual needs, and is not limited in the embodiments of the present disclosure.

Figure 16:
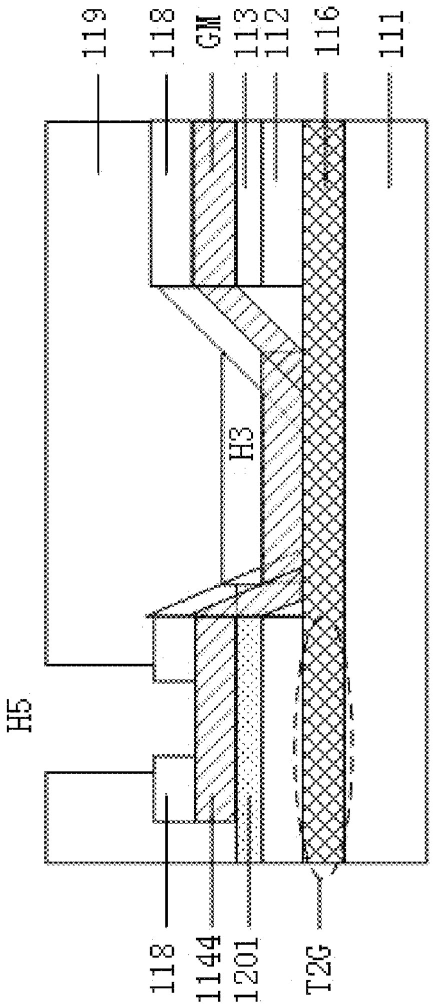
FIG. 16 is a cross-sectional schematic diagram of an array substrate in still another display panel provided by some embodiments of the present disclosure.

FIG. 16 is a cross-sectional schematic diagram of an array substrate in another display panel provided by some embodiments of the present disclosure. As illustrated in FIG. 16, in some examples, the array substrate 101 further includes a passivation layer 118 and a planarization layer 119. One of the first electrode 1143 of the first transistor T1 and the second electrode 1144 of the first transistor T1 is the drain electrode of the first transistor T1. In this example, the second electrode 1144 of the first transistor T1 is the drain electrode. The passivation layer 118 and the planarization layer 119 are sequentially stacked and located above the drain electrode of the first transistor T1 (i.e., located above the second electrode 1144 of the first transistor T1). The passivation layer 118 and the planarization layer 119 have a fifth via hole H5. The fifth via hole H5 penetrates through the passivation layer 118 and the planarization layer 119, and the fifth via hole H5 exposes the drain electrode of the first transistor T1. The fifth via hole H5 includes a step located at an interface between the passivation layer 118 and the planarization layer 119, and a width of the step is less than or equal to 1 μm.

For example, the light shielding layer 116 is arranged on the base substrate 111; the buffer layer 112 is arranged on the base substrate 111 and covers the light shielding layer 116; the light shielding layer 116 is made of metal; and the light shielding layer 116 serves as the gate electrode of the second transistor T2. An orthogonal projection of the fifth via hole H5 in the direction perpendicular to the base substrate 111 at least partially overlaps with an orthogonal projection of a portion of the light shielding layer 116 that serves as the gate electrode of the second transistor T2 in the direction perpendicular to the base substrate 111. In this example, the portion of the light shielding layer 116 that serves as the gate electrode of the second transistor T2 is, for example, the T2G illustrated in FIG. 16. The orthogonal projection of this portion in the direction perpendicular to the base substrate 111 at least partially overlaps (e.g., fully overlaps or partially overlaps) with the orthogonal projection of the fifth via hole H5 in the direction perpendicular to the base substrate 111. For example, the portion of the light shielding layer 116 that serves as the gate electrode of the second transistor T2 may be the portion of the light shielding layer 116 that overlaps with the active layer 1201 of the second transistor T2 in the direction perpendicular to the base substrate 111.

For example, in some examples, the light shielding layer 116 may also serve as the gate electrode of the fourth transistor T4; and the light shielding layer 116 may also serve as the first voltage terminal VDD. It should be noted that the light shielding layer 116 may serve as any one or more of the gate electrode of the second transistor T2, the gate electrode of the fourth transistor T4, and the first voltage terminal VDD, which may be determined according to actual needs, and is not limited in the embodiments of the present disclosure. For example, the light shielding layer 116 may only serve as the gate electrode of the second transistor T2; the light shielding layer 116 may only serve as the gate electrode of the fourth transistor T4; the light shielding layer 116 may only serve as the first voltage terminal VDD; the light shielding layer 116 may serve as any two of the gate electrode of the second transistor T2, the gate electrode of the fourth transistor T4, and the first voltage terminal VDD; the light shielding layer 116 may serve as the three of the gate electrode of the second transistor T2, the gate electrode of the fourth transistor T4, and the first voltage terminal VDD.

It should be noted that when multiplexing the light shielding layer 116, a corresponding multiplexed portion needs to be separated from other portions that are incapable of transmitting the electrical signal of the multiplexed portion by grooving, patterning, and other means according to an electrical connection relationship, so as to ensure correctness of the electrical connection relationship and correctness of the electrical signal.

For example, the light shielding layer 116 is made of metal. In some examples, the light shielding layer 116 may be a double-layer metal structure, so as to reduce resistance and improve impedance characteristics and electromagnetic compatibility characteristics. Of course, the light shielding layer 116 may also be a single-layer metal structure, a three-layer metal structure, or other applicable multi-layer metal structures, which may be determined according to actual needs, and is not limited in the embodiments of the present disclosure.

FIG. 17A to FIG. 17F are planar layouts of respective layer structures of an array substrate in a display panel provided by some embodiments of the present disclosure. Hereinafter, the process is briefly illustrated in conjunction with FIG. 17A to FIG. 17F.

Figure 17A:
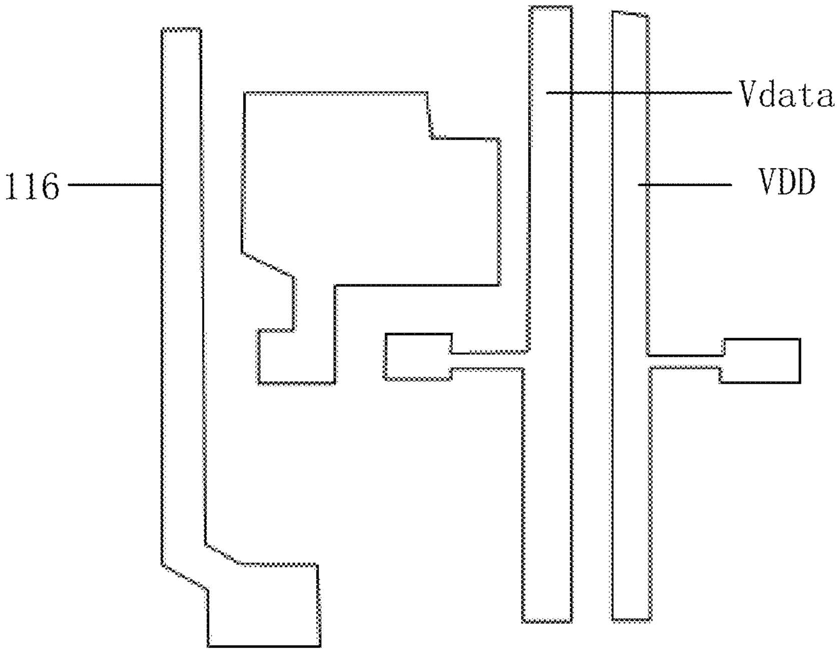
FIG. 17A to FIG. 17F are planar layouts of respective layer structures of an array substrate in a display panel provided by some embodiments of the present disclosure.

As illustrated in FIG. 17A, firstly a mask process is performed on the light shielding layer 116. The light shielding layer 116, for example, adopts a double-layer copper (Cu) structure, or may also adopt a molybdenum (Mo) and titanium/copper (Ti/Cu). A thickness of the light shielding layer 116 is 6300 Å. The light shielding layer 116 is used for implementing functions such as light shielding and source-drain signal input. For example, the data line Vdata and the first voltage terminal VDD are both formed in the light shielding layer 116, so the traditional SD film layer may be omitted, thereby reducing the number of film layers and reducing the process.

Figure 17B:
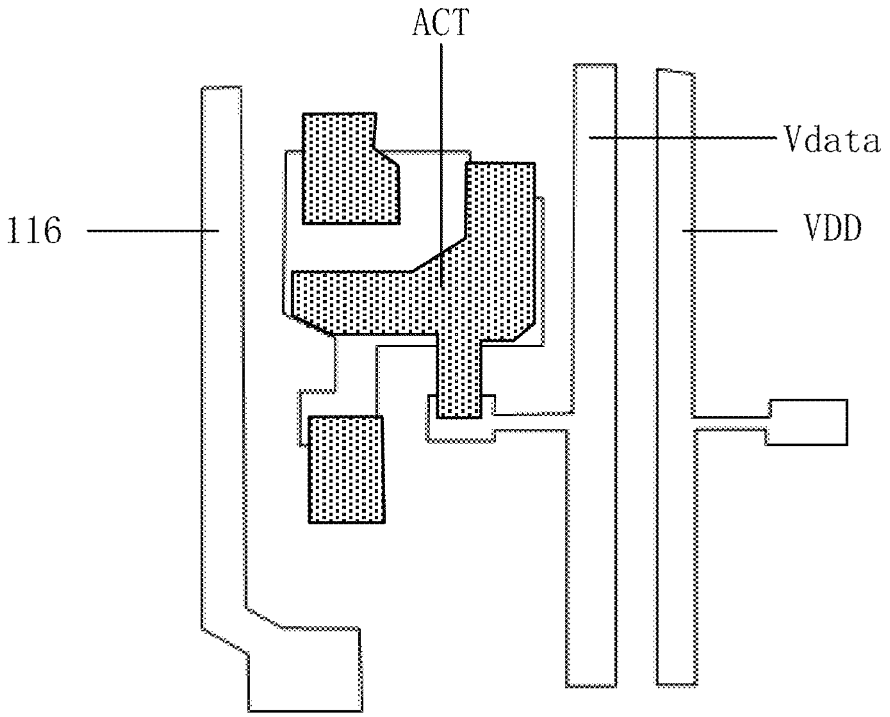

As illustrated in FIG. 17B, a mask process is subsequently performed on the active layer ACT. For example, the active layer ACT is made of IGZO and has a thickness of 480 Å. It should be noted that active layers of all transistors are formed in this process, including the active layer 1141 of the first transistor T1 and the active layers of other transistors.

Figure 17C:
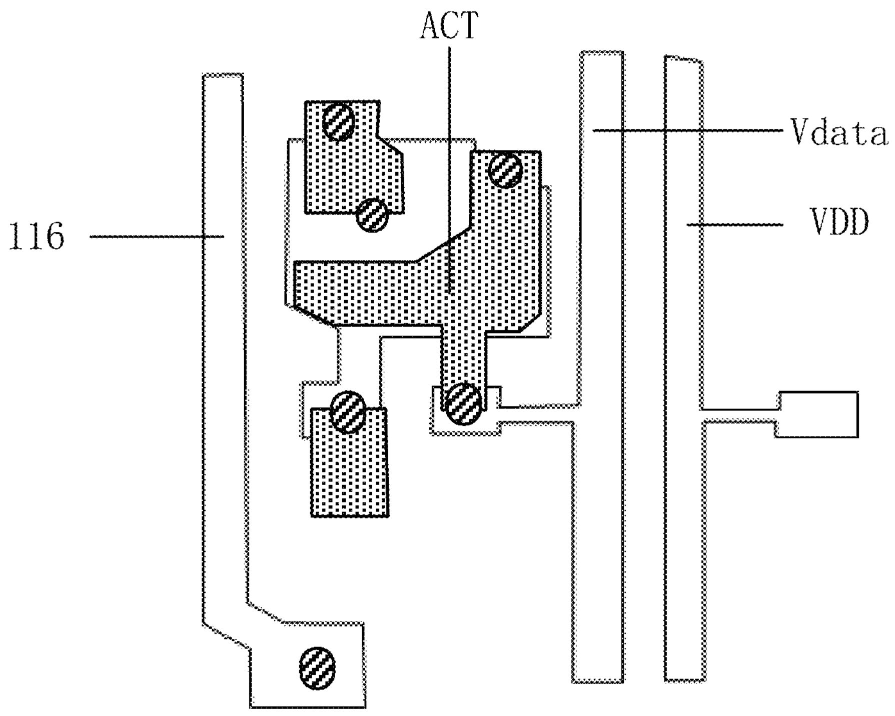

As illustrated in FIG. 17C, after the gate insulation layer 113 is masked, the gate insulation layer 113 is etched through by using an etching process. In the portion that needs to get in communication with the light shielding layer 116, both the gate insulation layer 113 and the buffer layer 112 need to be etched through, so as to form the first via hole H1, the second via hole H2, and the third via hole H3, etc. as described above. Due to obstruction of the active layer ACT (IGZO), the via hole in the buffer layer 112 is small;

and this via hole is used for connecting the gate metal layer GM and the light shielding layer 116.

Figure 17D:
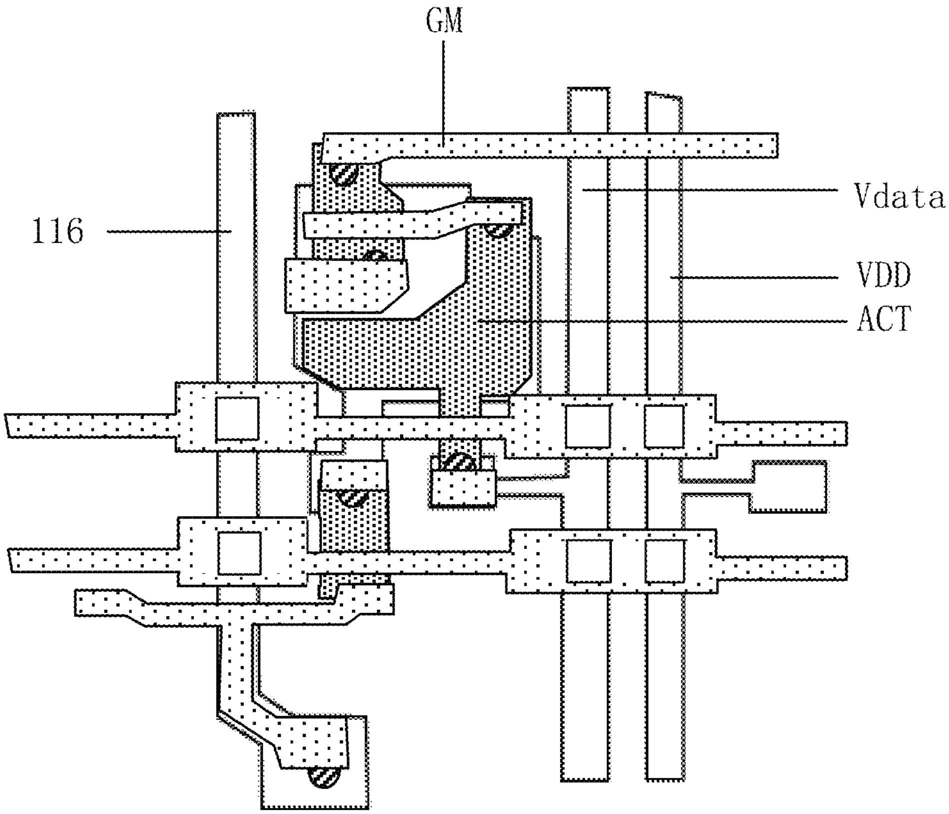

As illustrated in FIG. 17D, preparation of the gate metal layer GM is performed. After the gate metal layer GM is formed, it can be connected with the light shielding layer 116 through a corresponding via hole. The data signal and the first voltage are both transmitted from the corresponding multiplexed portion of the light shielding layer 116 to the corresponding portion of the gate metal layer GM. After the gate metal layer GM is etched, the gate insulation layer 113 is etched and the corresponding portion of the active layer ACT is conducted. For example, the third transistor T3, the fourth transistor T4, the first scanning line S1, and the second scanning line S2 are located on the same side of the first transistor T1.

Figure 17E:
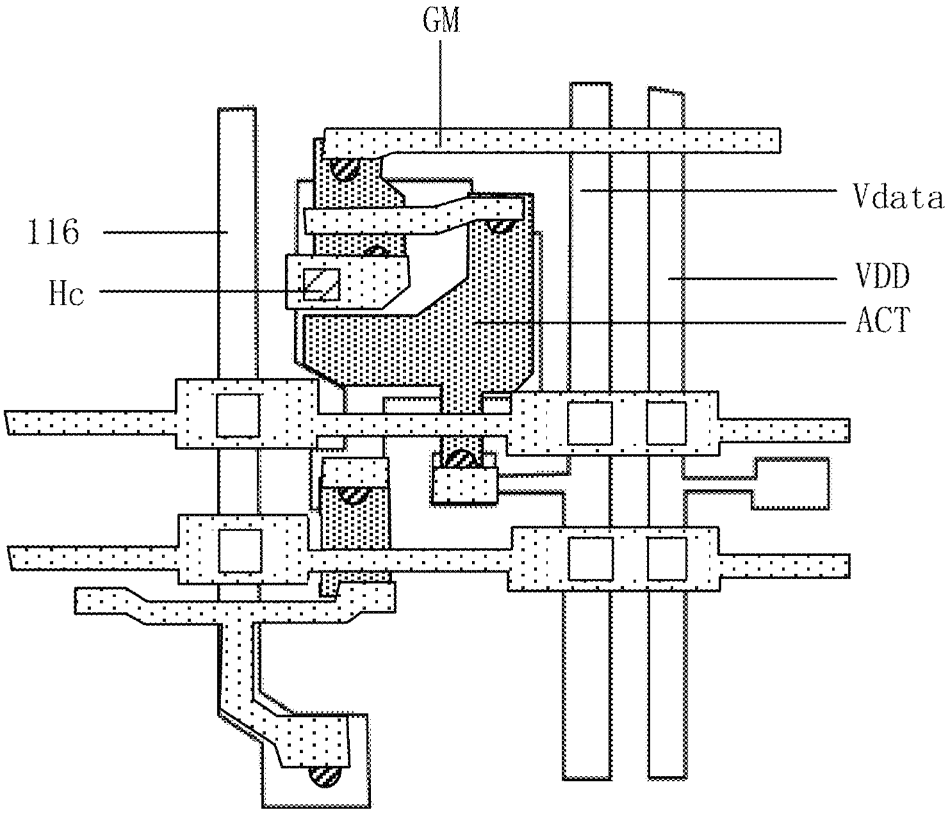

As illustrated in FIG. 17E, preparation of the passivation layer 118 and the planarization layer 119 is performed. For example, the passivation layer 118 and the planarization layer 119 may share a same mask process, and the via hole Hc is formed, so as to facilitate transmitting a corresponding signal to the anode of the subsequently formed OLED.

Figure 17F:
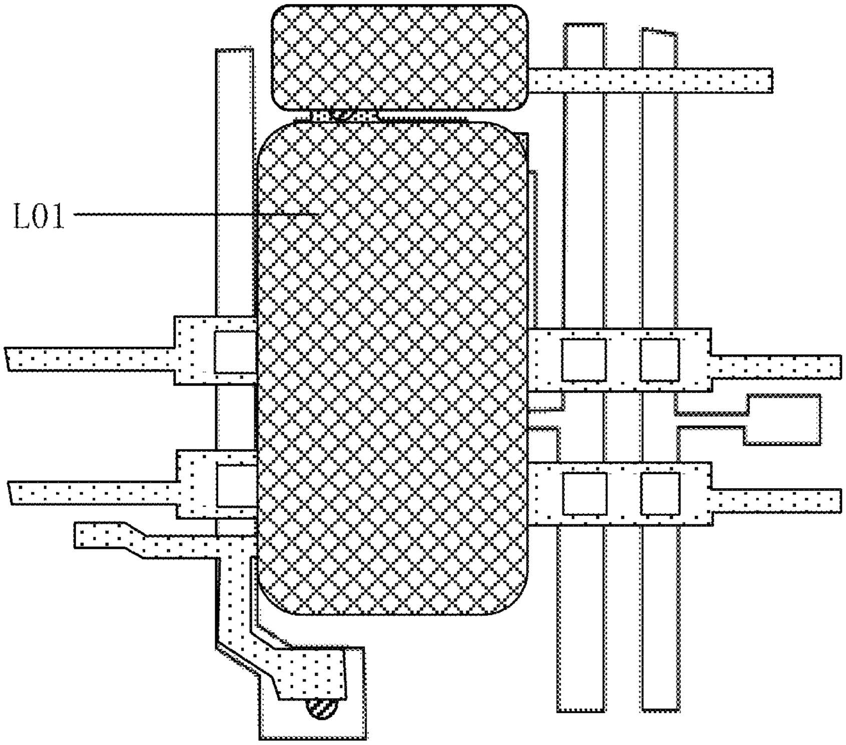

As illustrated in FIG. 17F, preparation of the OLED anode (the first terminal L01 of the light emitting element L) is performed. For example, the OLED anode is made of indium tin oxide (ITO).

Figure 18:
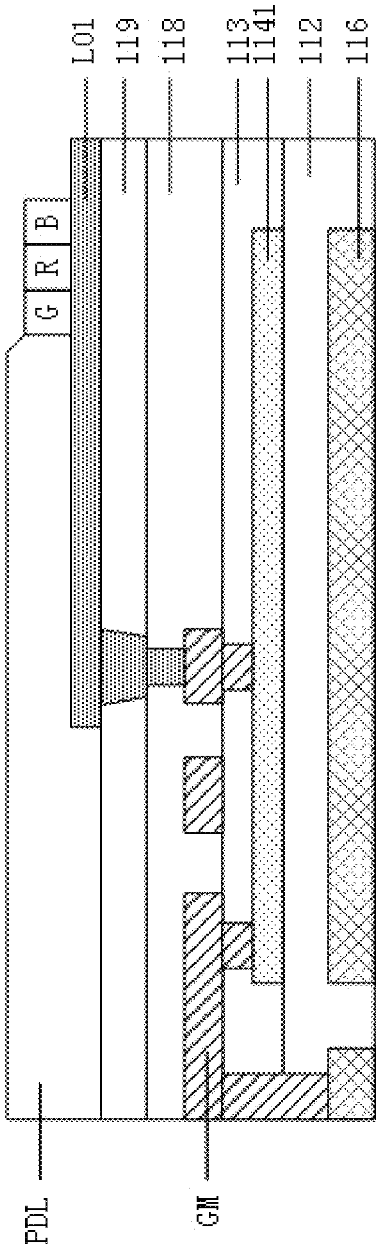
FIG. 18 is a cross-sectional schematic diagram of an array substrate in a display panel provided by some embodiments of the present disclosure.

It should be noted that the above text describes part of the processes, rather than the entire processes, for example, illustration of film layers such as the buffer layer 112 is omitted. For example, as illustrated in FIG. 18, process for film layers such as the pixel units (R, G, B) and the pixel defining layer PDL may also be included. The array substrate requires a total of 10 masks.

At least one embodiment of the present disclosure further provides a semiconductor display apparatus, and the semiconductor display apparatus includes a semiconductor substrate (i.e., a display panel) provided by any one embodiment of the present disclosure. The semiconductor display apparatus can reduce probability of damage to organic light-emitting diode (OLED) devices, play a role in protecting the OLED devices, and prolong the service life of the OLED devices.

Figure 19:
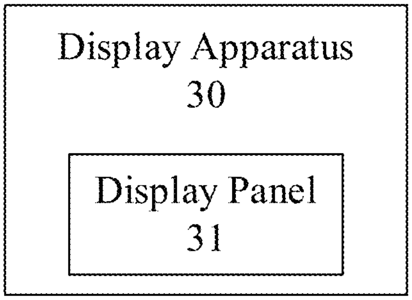
FIG. 19 is a schematic block diagram of a display apparatus provided by some embodiments of the present disclosure.

FIG. 19 is a schematic block diagram of a display apparatus provided by some embodiments of the present disclosure. As illustrated in FIG. 19, a display apparatus 30 includes a display panel 31, and the display panel 31 is the display panel provided by any one embodiment of the present disclosure, for example, the display panel 100 as described above. For example, the display apparatus 30 may be an OLED display panel, an OLED television, an OLED monitor, etc., or other applicable products or components having a display function, which is not limited in the embodiments of the present disclosure. The corresponding description about the display panel 100 according to the above-described embodiments may be referred to for the technical effect of the display apparatus 30, and no details are repeated here.

Figure 20:
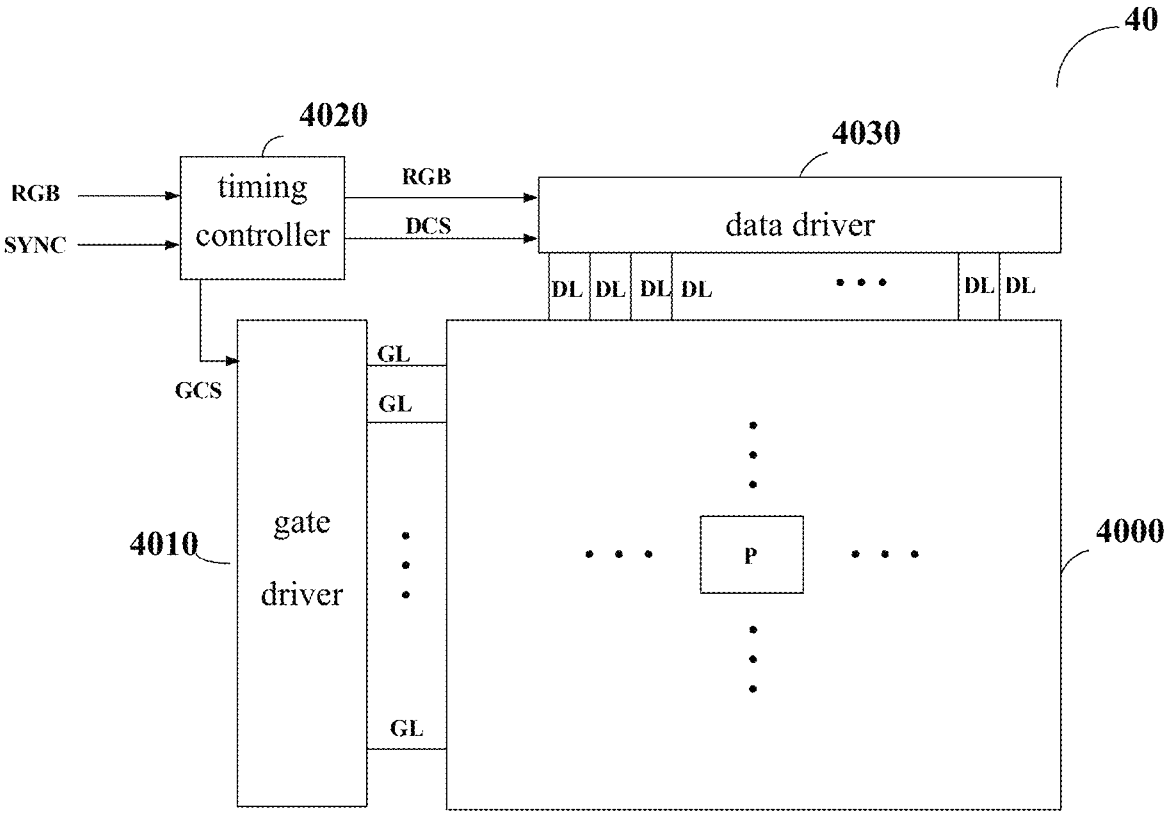
FIG. 20 is a schematic block diagram of another display apparatus provided by some embodiments of the present disclosure.

FIG. 20 is a schematic block diagram of another display apparatus provided by some embodiments of the present disclosure. As illustrated in FIG. 20, a display apparatus 40 includes a display panel 4000, a gate driver 4010, a timing controller 4020, and a data driver 4030. The display panel 4000 includes a plurality of pixel units P defined by a plurality of gate lines GL and a plurality of data lines DL intersecting with each other. The display panel 4000, for example, is the display panel provided by any one embodiment of the present disclosure, for example, the display panel 100 as described above. The plurality of gate lines GL include the first scanning line S1 and the second scanning line S2 as described above; and the plurality of data lines DL include the data line Vdata as described above. The gate driver 4010 is used for driving the plurality of gate lines GL; the data driver 4030 is used for driving the plurality of data lines DL; and the timing controller 4020 is used for processing image data RGB input from outside the display apparatus 40, supplying processed image data RGB to the data driver 4030, and outputting gate control signals GCS and data control signals DCS to the gate driver 4010 and data driver 4030, so as to control the gate driver 4010 and the data driver 4030.

For example, the gate driver 4010 may be implemented as a semiconductor chip, or may also be integrated into the display panel 4000 to form a GOA circuit.

For example, the data driver 4030 converts the digital image data RGB input from the timing controller 4020 into a data signal by using a reference gamma voltage according to the plurality of data control signals DCS originated from the timing controller 4020. The data driver 4030 supplies the converted data signals to the plurality of data lines DL. For example, the data driver 4030 may be implemented as a semiconductor chip.

For example, the timing controller 4020 processes the externally input image data RGB to match the size and resolution of the display panel 4000, and then supplies the processed image data to the data driver 4030. The timing controller 4020 generates a plurality of gate control signals GCS and a plurality of data control signals DCS by using synchronization signals (e.g., a dot clock signal DCLK, a data enable signal DE, a horizontal synchronization signal Hsync, and a vertical synchronization signal Vsync) input from outside the display apparatus 40. The timing controller 4020 supplies the gate control signals GCS and the data control signals DCS generated respectively to the gate driver 4010 and the data driver 4030, for controlling the gate driver 4010 and the data driver 4030.

The display apparatus 40 may further include other components, for example, a signal decoding circuit, a voltage converting circuit, etc.; these components may, for example, be existing conventional components, and no details are repeated here.

For example, the display panel 4000 may be applied to an e-book, a mobile phone, a tablet personal computer, a television, a monitor, a laptop, a digital photo frame, a navigator, and any other product or component having a display function.

At least one embodiment of the present disclosure further provides a driving method, for driving the semiconductor substrate (i.e., the display panel) provided by any one embodiment of the present disclosure. By using the driving method, probability of damage to organic light-emitting diode (OLED) devices is reduced, it can play a role in protecting the OLED devices and prolong the service life of the OLED devices.

Figure 21:
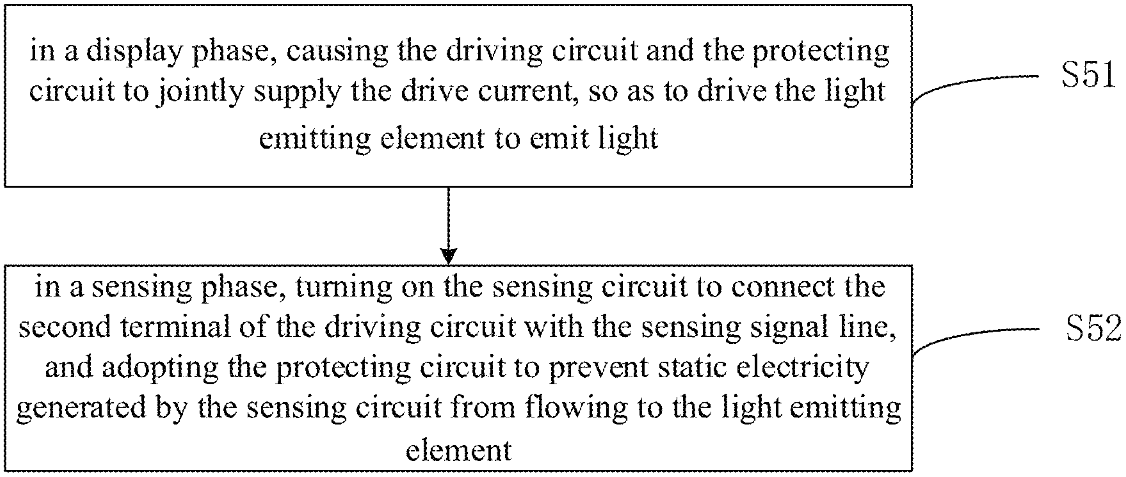
FIG. 21 is a schematic flow chart of a method for driving a display panel provided by some embodiments of the present disclosure.

FIG. 21 is a schematic flow chart of a method for driving a display panel provided by some embodiments of the present disclosure. As illustrated in FIG. 21, in some embodiments, the driving method includes operations below.

Step S51: in a display phase, causing the driving circuit and the protecting circuit to jointly supply a drive current, so as to drive the light emitting element to emit light.

Step S52: in a sensing phase, turning on the sensing circuit to connect the second terminal of the driving circuit with the sensing signal line, and adopting the protecting circuit to prevent static electricity generated by the sensing circuit from flowing to the light emitting element.

It should be noted that the description of the operation principle of the pixel circuit 20 according to the embodiments of the present disclosure may be referred to for detailed description of the driving method, and no details are repeated here.

The following statements should be noted.

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

The invention claimed is:

1. A semiconductor substrate, comprising an array substrate, wherein the array substrate comprises a plurality of pixel units arranged in an array, and each pixel unit comprises a pixel circuit and a light emitting element;

the pixel circuit comprises a driving circuit, a data writing circuit, a storage circuit, a sensing circuit, and a protecting circuit;

the driving circuit comprises a control terminal, a first terminal, and a second terminal, and is configured to control a drive current that drives the light emitting element to emit light, and the first terminal of the driving circuit receives a first voltage of a first voltage terminal;

the data writing circuit is connected with the control terminal of the driving circuit, and is configured to write a data signal into the control terminal of the driving circuit in response to a first scanning signal;

a first terminal of the storage circuit is connected with the control terminal of the driving circuit, a second terminal of the storage circuit is connected with the second terminal of the driving circuit, and the storage circuit is configured to store the data signal written by the data writing circuit;

the sensing circuit is connected with the second terminal of the driving circuit, and is configured to connect the second terminal of the driving circuit with a sensing signal line in response to a second scanning signal;

the protecting circuit comprises a control terminal, a first terminal, and a second terminal, the first terminal of the protecting circuit is connected with the first terminal of the driving circuit, the control terminal of the protecting circuit and the second terminal of the protecting circuit are both connected with the second terminal of the driving circuit, and the protecting circuit is configured to prevent static electricity generated by the sensing circuit from flowing to the light emitting element and supply the drive current jointly with the driving circuit; and a first terminal of the light emitting element is connected with the second terminal of the driving circuit, a second terminal of the light emitting element receives a second voltage of a second voltage terminal, and the light emitting element is configured to emit light according to the drive current.

2. The semiconductor substrate according to claim 1, wherein the driving circuit comprises a first transistor; and a gate electrode of the first transistor serves as the control terminal of the driving circuit, a first electrode of the first transistor serves as the first terminal of the driving circuit, and a second electrode of the first transistor serves as the second terminal of the driving circuit.

3. The semiconductor substrate according to claim 2, wherein the protecting circuit comprises a second transistor;

a gate electrode of the second transistor serves as the control terminal of the protecting circuit, a first electrode of the second transistor serves as the first terminal of the protecting circuit, and a second electrode of the second transistor serves as the second terminal of the protecting circuit;

the first electrode of the second transistor is connected with the first electrode of the first transistor; and the gate electrode of the second transistor is connected with the second electrode of the second transistor, and is connected with the second electrode of the first transistor.

4. The semiconductor substrate according to claim 3, wherein the second transistor constitutes a diode-connection mode.

5. The semiconductor substrate according to claim 3, wherein the first transistor and the second transistor are both N-type thin film transistors or are both P-type thin film transistors.

6. The semiconductor substrate according to claim 2, wherein the data writing circuit comprises a third transistor; and a gate electrode of the third transistor is connected with a first scanning line to receive the first scanning signal, a first electrode of the third transistor is connected with a data line to receive the data signal, and a second electrode of the third transistor is connected with the control terminal of the driving circuit.

7. The semiconductor substrate according to claim 6, wherein the sensing circuit comprises a fourth transistor; and a gate electrode of the fourth transistor is connected with a second scanning line to receive the second scanning signal, a first electrode of the fourth transistor is connected with the second terminal of the driving circuit, and a second electrode of the fourth transistor is connected with the sensing signal line.

8. The semiconductor substrate according to claim 1, wherein the storage circuit comprises a storage capacitor; and a first electrode of the storage capacitor serves as the first terminal of the storage circuit, and a second electrode of the storage capacitor serves as the second terminal of the storage circuit.

9. The semiconductor substrate according to claim 1, wherein the light emitting element comprises an organic light-emitting diode, an anode of the organic light-emitting diode serves as the first terminal of the light emitting element, and a cathode of the organic light-emitting diode serves as the second terminal of the light emitting element.

10. The semiconductor substrate according to claim 1, further comprising a reset circuit, wherein the reset circuit is connected with the control terminal of the driving circuit, and is configured to apply a reset voltage to the control terminal of the driving circuit in response to a reset signal.

11. The semiconductor substrate according to claim 10, wherein the reset circuit comprises a fifth transistor; and a gate electrode of the fifth transistor is connected with a reset signal line to receive the reset signal, a first electrode of the fifth transistor is connected with the control terminal of the driving circuit, and a second electrode of the fifth transistor is connected with a reset voltage terminal to receive the reset voltage.

12. The semiconductor substrate according to claim 11, wherein the reset voltage terminal and the second voltage terminal are a same voltage terminal, and the reset voltage and the second voltage are a same voltage signal.

13. The semiconductor substrate according to claim 2, wherein a channel width-to-length ratio of the first transistor ranges from 12.6:6 to 16.2:6.

14. The semiconductor substrate according to claim 3, wherein the array substrate comprises a base substrate, a buffer layer, and a gate insulation layer;

the first transistor comprises an active layer; and the buffer layer is arranged on the base substrate, the active layer is arranged on the buffer layer, the gate insulation layer is arranged on the buffer layer and covers the active layer, and the gate electrode of the first transistor is arranged on the gate insulation layer.

15. The semiconductor substrate according to claim 14, wherein the array substrate further comprises an interlayer insulation layer; and the interlayer insulation layer is arranged on the gate insulation layer and covers the gate electrode of the first transistor, and the first electrode of the first transistor and the second electrode of the first transistor are arranged on the interlayer insulation layer.

16. The semiconductor substrate according to claim 14 wherein the first electrode of the first transistor and the second electrode of the first transistor are arranged on the gate insulation layer, and the first electrode of the first transistor, the second electrode of the first transistor, and the gate electrode of the first transistor are located in a same layer.

17. The semiconductor substrate according to claim 14, wherein the first electrode of the first transistor is connected with the active layer through a first via hole at least penetrating through the gate insulation layer, and the second electrode of the first transistor is connected with the active layer through a second via hole at least penetrating through the gate insulation layer.

18. The semiconductor substrate according to claim 17, wherein the active layer comprises at least one grooved region, and the grooved region is a hole that penetrates through the active layer in a direction perpendicular to the base substrate.

19. A semiconductor display apparatus, comprising the semiconductor substrate according to claim 1.

20. A method for driving the semiconductor substrate according to claim 1, comprising:

in a display phase, causing the driving circuit and the protecting circuit to jointly supply the drive current, so as to drive the light emitting element to emit light; and in a sensing phase, turning on the sensing circuit to connect the second terminal of the driving circuit with the sensing signal line, and adopting the protecting circuit to prevent static electricity generated by the sensing circuit from flowing to the light emitting element.

* * * * *